US008699197B2

(12) United States Patent
Douglass et al.

(10) Patent No.: US 8,699,197 B2
(45) Date of Patent: Apr. 15, 2014

(54) COMPACT TRANSIENT VOLTAGE SURGE SUPPRESSION DEVICE

(75) Inventors: Robert Stephen Douglass, Wildwood, MO (US); Hundi Panduranga Kamath, Los Altos, CA (US); Piyush K. Saxena, Ballwin, MO (US); William Charles Giancola, Ballwin, MO (US); Keith Allen Spalding, Fenton, MO (US)

(73) Assignee: Cooper Technologies Company, Houston, TX (US)

( * ) Notice: Subject to any disclaimer, the term of this patent is extended or adjusted under 35 U.S.C. 154(b) by 271 days.

(21) Appl. No.: 13/211,032

(22) Filed: Aug. 16, 2011

(65) Prior Publication Data

US 2012/0050935 A1 Mar. 1, 2012

Related U.S. Application Data

(63) Continuation-in-part of application No. 12/870,452, filed on Aug. 27, 2010.

(51) Int. Cl.
*H02H 1/00* (2006.01)
*H02H 1/04* (2006.01)
*H02H 3/22* (2006.01)

(52) U.S. Cl.
USPC .......................................... 361/118; 361/117

(58) Field of Classification Search
USPC ................................................ 361/127, 118
See application file for complete search history.

(56) References Cited

U.S. PATENT DOCUMENTS

| | | | | |
|---|---|---|---|---|
| 5,220,480 | A | 6/1993 | Kershaw, Jr. et al. | |
| 5,608,596 | A | 3/1997 | Smith et al. | |
| 5,781,394 | A | 7/1998 | Lorenz et al. | |
| 5,956,223 | A | 9/1999 | Banting | |
| 6,430,019 | B1 | 8/2002 | Martenson et al. | |
| 2006/0245125 | A1 | 11/2006 | Aszmus | |
| 2011/0032651 | A1 * | 2/2011 | Depping et al. ............. | 361/91.1 |

FOREIGN PATENT DOCUMENTS

| | | | |
|---|---|---|---|
| DE | 9414357.9 | U1 | 10/1994 |
| DE | 102010008537 | A1 | 8/2011 |
| EP | 2256750 | A1 | 12/2010 |
| WO | 2007105066 | A1 | 9/2007 |
| WO | 2008069870 | A1 | 6/2008 |
| WO | 2009038418 | A2 | 3/2009 |

OTHER PUBLICATIONS

International Search Report and Written Opinion of PCT/US2011/048239; Dec. 14, 2011; 13 pages.
International Search Report and Written Opinion for PCT/US2011/048583, 23 pages, dated May 10, 2012.
International Preliminary Report on Patentability and Written Opinion of PCT/US2011/048239; Mar. 14, 2013; 8 pages.
International Preliminary Report on Patentability and Written Opinion of PCT/US2011/048583; Mar. 14, 2013; 11 pages.

* cited by examiner

*Primary Examiner* — Dharti Patel
(74) *Attorney, Agent, or Firm* — Armstrong Teasdale LLP

(57) ABSTRACT

A transient voltage surge suppression device includes a varistor assembly having a compact thickness, and thermal disconnect assembly carrying a separable contact bridge movable along a linear axis to disconnect the varistor element from external circuitry.

39 Claims, 25 Drawing Sheets

COMPACT TRANSIENT VOLTAGE SURGE SUPPRESSION DEVICE

CROSS REFERENCE TO RELATED APPLICATIONS

This application is a continuation-in-part application of U.S. patent application Ser. No. 12/870,452 filed Aug. 27, 2010, the disclosure of which is hereby incorporated by reference in its entirety.

BACKGROUND OF THE INVENTION

The field of the invention relates generally to circuit protection devices, and more specifically to transient voltage surge suppression devices.

Transient voltage surge suppression devices, sometimes referred to as surge protection devices, have been developed in response to the need to protect an ever-expanding number of electronic devices upon which today's technological society depends from high voltages of a short, or transient duration. Electrical transient voltages can be created by, for example, electrostatic discharge or transients propagated by human contact with electronic devices themselves, or via certain conditions in line side electrical circuitry powering the electronic devices. Thus, it is not uncommon for electronic devices to include internal transient voltage surge suppression devices designed to protect the device from certain overvoltage conditions or surges, and also for line side circuitry powering the electronic devices in an electrical power distribution system to include transient voltage surge suppression devices. Examples of electrical equipment which typically employ transient voltage protection equipment include telecommunications systems, computer systems and control systems.

Transient voltage surge suppression devices for electrical power systems are commonly employed to protect designated circuitry, which may include expensive pieces of electrical equipment, critical loads, or associated electronic devices powered by the system. The surge suppression devices normally exhibit a high impedance, but when an over-voltage event occurs, the devices switch to a low impendence state so as to shunt or divert over-voltage-induced current to electrical ground. Damaging currents are therefore diverted from flowing to associated load side circuitry, thereby protecting the corresponding equipment, loads and electronic devices from damage. Improvements, however, are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
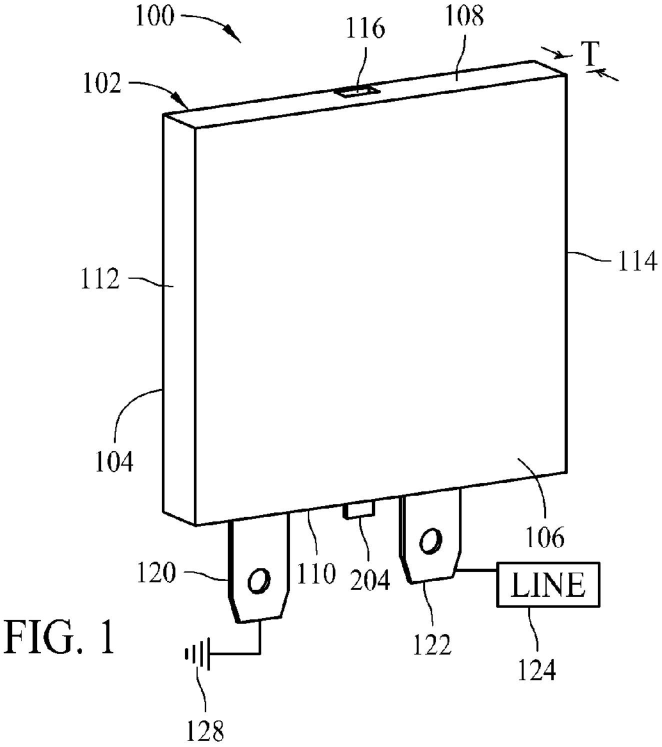
FIG. 1 is a perspective view of an exemplary surge suppression device.

Electrical power systems are subject to voltages within a fairly narrow range under normal operating conditions. However, system disturbances, such as lightning strikes and switching surges, may produce momentary or extended voltage levels that exceed the levels experienced by the circuitry during normal operating conditions. These voltage variations often are referred to as over-voltage conditions. As mentioned previously, transient surge suppression devices have been developed to protect circuitry against such over-voltage conditions.

Transient surge suppression devices typically include one or more voltage-dependent, nonlinear resistive elements, referred to as varistors, which may be, for example, metal oxide varistors (MOV's). A varistor is characterized by having a relatively high resistance when exposed to a normal operating voltage, and a much lower resistance when exposed to a larger voltage, such as is associated with over-voltage conditions. The impedance of the current path through the varistor is substantially lower than the impedance of the circuitry being protected when the device is operating in the low-impedance mode, and is otherwise substantially higher than the impedance of the protected circuitry. As over-voltage conditions arise, the varistors switch from the high impedance mode to the low impedance mode and shunt or divert over-voltage-induced current surges away from the protected circuitry and to electrical ground, and as over-voltage conditions subside, the varistors return to a high impedance mode.

While existing transient surge suppression devices have enjoyed some success in protecting electrical power systems and circuitry from transient over-voltage events, they are susceptible to certain failure modes that may nonetheless result in damage to the load side circuitry that the transient voltage suppression device was intended to protect.

More specifically, in response to extreme over-voltage events (i.e., very high over-voltage conditions), the varistors switch very rapidly to the low impedance mode, and because of exposure to extremely high voltage and current the varistors degrade rapidly and sometimes fail, perhaps catastrophically. Catastrophic failure of surge suppression devices can itself cause damage to the load side circuitry intended to be protected.

Still another problem with known transient surge suppression devices is that if overvoltage conditions are sustained for a period of time, even for low to moderate over-voltage conditions, the varistors (e.g., MOVs) can overheat and fail, sometimes catastrophically. If the failure occurs when the MOV is in a conductive state, short circuit conditions and electrical arcing may result that could lead to further damage.

To address such problems, known surge suppression devices have been used in combination with a series connected fuse or circuit breaker. As such, the fuses or circuit breakers can more effectively respond to overcurrent conditions resulting from over-voltage conditions in which, at least for some duration of time, the varistor in the surge suppression device is incapable of completely suppressing over-voltage conditions.

While series connected transient surge suppression devices and fuses or breakers can be effective to open circuitry in response to over-voltage conditions that could otherwise cause damage, this is not a completely satisfactory solution. In cases wherein the MOV's become partially conductive due to sustained overvoltage conditions, the fuse or breaker may not operate if the current flowing through the MOV is below the rating of the fuse or breaker. In such conditions, even relatively small currents flowing through the MOV over a length of time can produce thermal runaway conditions and excessive heat in the MOV that can lead to its failure. As mentioned above, this can lead to short circuit conditions and perhaps a catastrophic failure of the device presents practical concerns.

Aside from the performance and reliability issues noted above, additional cost and installation space is required for the series connected transient surge suppression devices and fuses or breakers. Additional maintenance issues result from having such series connected components as well.

Some effort has been made to provide a transient voltage surge protection device that provides safe and effective operation for a full range of over-voltage conditions, while avoiding catastrophic failure of the varistor element. For example, Ferraz Shawmut has introduced a thermally protected surge suppression device marketed as a TPMOV® device. The TPMOV® device is described in U.S. Pat. No. 6,430,019 and includes thermal protection features designed to disconnect an MOV and prevent it from reaching a point of catastrophic failure. The TPMOV® device is intended to obviate any need for a series connected fuse or breaker.

The TPMOV® device remains vulnerable, however, to failure modes that can still result in damage. Specifically, if the MOV fails rapidly in an extreme overvoltage event, short circuit conditions may result before the thermal protection features can operate, and severe arcing conditions and potential catastrophic failure may result. Additionally, the construction of the TPMOV® device is somewhat complicated, and relies upon a movable arc shield to disconnect the MOV, and also an electrical microswitch to implement. The presence of the arc shield adds to the overall dimensions of the device. More compact and lower cost options are desired.

Also, the TPMOV® device and other devices presently available include epoxy potted or encapsulated MOV discs. While such encapsulated MOVs can be effective, they tend to entail additional manufacturing steps and cost that would preferably be avoided.

Exemplary embodiments of compact transient voltage surge protection devices are described hereinbelow that overcome the disadvantages discussed above. Smaller, cheaper, and more effective devices are provided with a unique varistor assembly and distinct first and second disconnect modes of operation as explained below to reliably protect the varistor from failing in a full variety of over-voltage conditions.

Turning now to the drawings, FIG. 1 is a perspective view of an exemplary surge suppression device 100 including a generally thin and rectangular, box-like housing 102. Accordingly, the housing 102 in the example shown includes opposing main faces or sides 104 and 106, upper and lower faces or sides 108 and 110, interconnecting adjoining edges of the sides 104 and 106, and lateral sides 112 and 114 interconnecting adjoining edges of the sides 104 and 106 and adjoining edges of the upper and lower sides 108, 110. All of the sides 104, 106, 108, 110, 112 and 114 are generally flat and planar, and extend generally parallel with the respective opposing sides to form a generally orthogonal housing 102. In other embodiments, the sides of the housing 102 need not be flat and planar, nor arranged orthogonally. Various geometric shapes 102 of the housing are possible.

Additionally, in the depicted embodiment, the housing main face 106 may sometimes referred to as a front face of the device 100 and is a substantially solid face without openings or apertures extending therein or therethrough, while the housing main face 104 (also shown in FIG. 2) may be referred to as a rear face. The rear face 104, unlike the front face 106, extends only on the periphery of the device 100 adjacent the sides 108, 112 and 114. That is, the rear face 104 in the exemplary embodiment shown is a frame-like element having a large central opening exposing components of the device 100 on the rear side. As such, the front side 106 entirely covers and protects the internal components of the device 100 on the front side of the device 100, while the rear side 104 generally exposes components of the device 100 on the rear side. Other arrangements of the housing 102 are possible, however, and may be used in other embodiments to provide varying degrees of enclosure for the front and rear sides of the device 100.

The housing 102 has a compact profile or thickness T that is less than known surge suppression devices such as the TPMOV® device described above. Additionally, the outer peripheries of the housing main sides 104 and 106 are approximately square, and the sides 108, 110, 112 and 114 are elongated and rectangular, although other proportions of the housing 102 are possible in other embodiments.

The upper side 108 of the housing 102 is formed with a generally elongated opening 116 through which a portion of a thermal disconnect element, described below, may project to visually indicate a state of the device 100. The lower side 110 of the housing 102 likewise includes an opening (not shown) in which an indicating tab 204 projects, also to provide visual indication of a state of the device.

The housing 102 may be formed from an insulating or electrically nonconductive material such as plastic, according to known techniques such as molding. Other nonconductive materials and techniques are possible, however, to fabricate the housing 102 in further and/or alternative embodiments. Additionally, the housing 102 may be formed and assembled from two or more pieces collectively defining an enclosure for at least the front side of the varistor assembly described below.

Blade terminals 120 and 122 extend from the lower side 110 of the housing 102 in the embodiment shown. The blade terminals 120 and 122 are generally planar conductive elements having chamfered leading edges and apertures therethrough. Further, the blade terminals 120 and 122 are offset from one another in spaced apart, but generally parallel planes. The first terminal 120 is closer to the rear side 104 and extends in a parallel plane to the rear side 104, while the terminal 122 is closer to the front side 106 and extends in a parallel plane to the front side 106. Other arrangements of the terminals are possible in other embodiments, and it is recognized that the blade terminals shown are not necessarily required. That is, terminals other than blade-type terminals could likewise be provided if desired to establish electrical connections to circuitry as briefly described below.

The blade terminals 122 and 120 may respectively connect with a power line 124 and a ground line, ground plane or neutral line designated at 128, with plug-in connection to a circuit board or another device connected to the circuitry. A varistor element, described below, is connected in the device 100 between the terminals 120 and 122. The varistor element provides a low impedance path to ground in the event of an over-voltage condition in the power line 124. The low impedance path to ground effectively directs otherwise potentially damaging current away from and around downstream circuitry connected to the power line 124. In normal operating conditions, the varistor provides a high impedance path such that the varistor effectively draws no current and does not affect the voltage of the power line 124. The varistor may switch between the high and low impedance modes to regulate the voltage on the power line 124, either standing alone or in combination with other devices 100. Additionally, and as explained below, the varistor may be disconnected from the power line 124 in at least two distinct modes of operation, in response to different operating over-voltage conditions in the power line 124, to ensure that the varistor will not fail catastrophically. Once disconnected, the device 100 must be removed and replaced.

Figure 2:
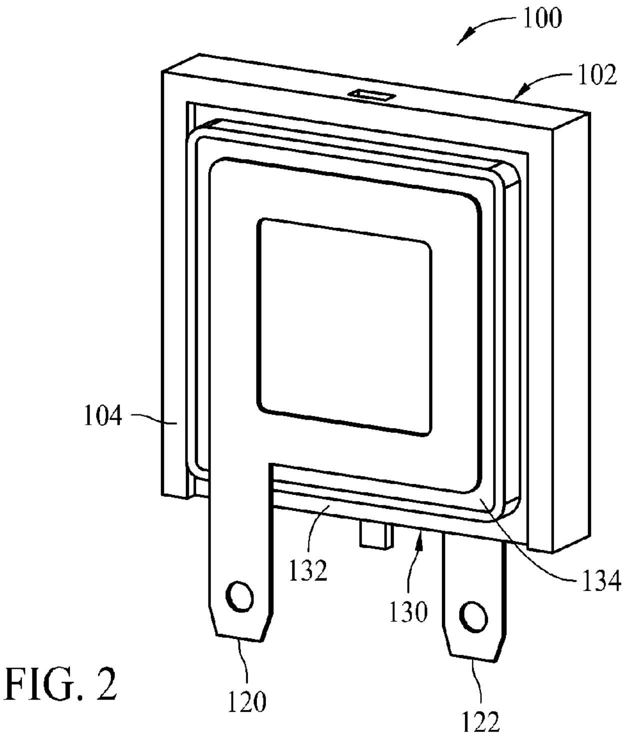
FIG. 2 is a rear perspective view of the device shown in FIG. 1.

FIG. 2 is a rear perspective view of the device 100 shown wherein a rear side of a varistor assembly 130 is exposed. The varistor assembly 130 includes an insulative base plate 132 and a varistor element 134. The terminals 120, 122 are shown on opposing sides of the varistor assembly 130. The voltage potential of the power line 124 is placed across the terminals 120, 122 and, in turn, across the varistor element 134.

Figure 3:
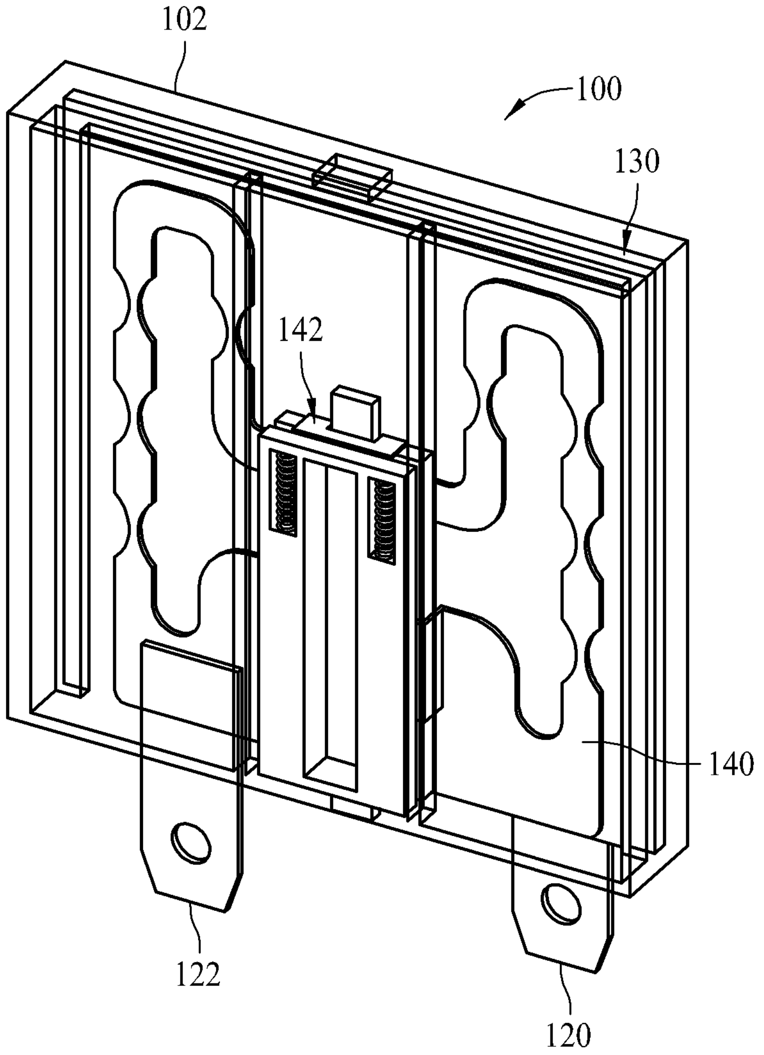
FIG. 3 is a partial front perspective view of the device shown in FIGS. 1 and 2.

FIG. 3 is a partial front perspective view of the device 100 including the varistor assembly 130, a short circuit disconnect element 140, and a thermal disconnect element 142 each providing a different mode of disconnecting the varistor 134. The short circuit disconnect element 140 and the thermal disconnect element 142 are each located opposite the varistor 134 on the other side of the insulative base plate 132. The terminal 122 is connected to the short circuit disconnect element 140, and the terminal 120 is connected to the varistor 134.

Optionally, and as shown in FIG. 3, one or more of the sides of the housing 102 may be wholly or partially transparent such that one or more of the varistor assembly 130, the short circuit disconnect element 140 and the thermal disconnect element 142 may be seen through the housing 102. Alternatively, windows may be provided in the housing to reveal selected portions of the varistor assembly 130, the short circuit disconnect element 140 and the thermal disconnect element 142.

Figure 4:
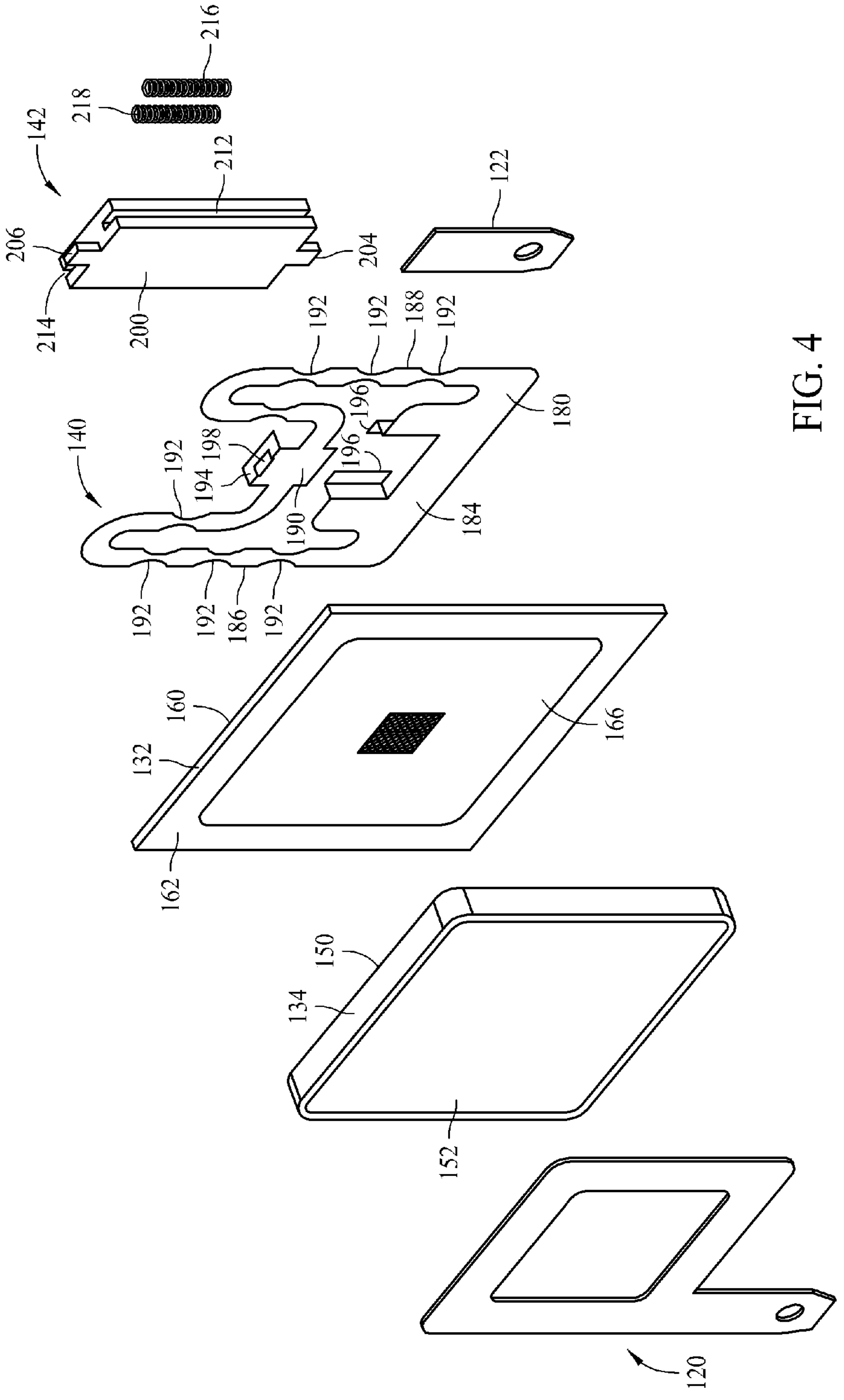
FIG. 4 is an exploded view of the device shown in FIGS. 1-3.
Figure 7:
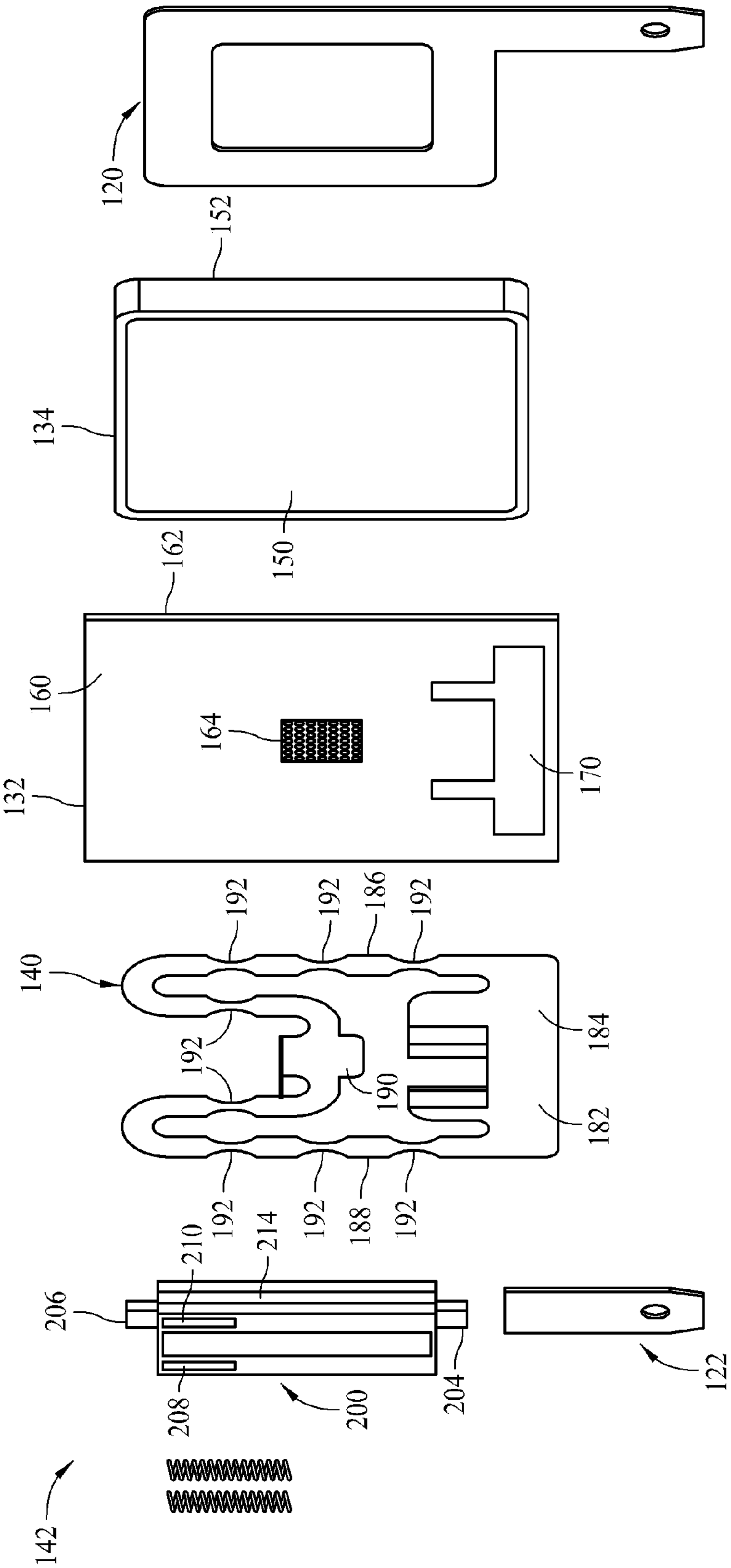
FIG. 7 is a another exploded view of the device shown in FIGS. 1-3.

FIG. 4 is a rear exploded view of the device 100 including, from left to right, the terminal 120, the varistor 134, the insulative base plate 132, the short circuit element 140, the thermal disconnect element 142, and the terminal 122. FIG. 7 shows the same components in exploded front view, the reverse of FIG. 4. The housing 102 is not shown in FIGS. 4 and 7, but it is understood that the components shown in FIGS. 4 and 7 are generally contained in the housing 102 or exposed through the housing 102 as shown in FIGS. 1 and 2 in the illustrative embodiment depicted.

The varistor 134 is a non-linear varistor element such a metal oxide varistor (MOV). As the MOV is a well understood varistor element it will not described in detail herein, except to note that it is formed in a generally rectangular configuration having opposed and generally parallel faces or sides 150 and 152 and slightly rounded corners. The varistor 134 has a generally constant thickness and is solid throughout (i.e., does not include any voids or openings). As those in the art understand, the MOV is responsive to applied voltage to switch from a high impedance state or mode to a low impedance state or mode. The varistor switches state and dissipates heat in an over-voltage condition, wherein the voltage placed across the terminals 120 and 122 exceeds a clamping voltage for the MOV and the MOV becomes conductive to divert current to electrical ground.

Unlike conventional surge suppression devices such as those discussed above, the varistor 134 need not be an epoxy potted or otherwise encapsulated varistor element due to the construction and assembly of the device 100 that obviates any need for such encapsulation. Manufacturing steps and cost associated with encapsulating the varistor 134 are accordingly avoided.

The terminal 120 is formed as a generally planar conductive member that is surface mounted to the side 152 of the varistor element 134. The terminal 120 may be fabricated form a sheet of conductive metal or metal alloy according to known techniques, and as shown in the illustrated embodiment includes a generally square upper section that is complementary in shape to the profile of the varistor element 134, and a contact blade extending therefrom as shown in the Figures. The square upper section of the terminal 120 is soldered to side 152 of the varistor using a high temperature solder known in the art. The square upper section of the terminal 120 provides a large contact area with the varistor 134. In other embodiments, the terminal 120 could have numerous other shapes as desired, and the contact blade could be separately provided instead of integrally formed as shown.

The side 150 of the varistor element 134, opposite to the side 152 including the surface mounted terminal 120, is surface mounted to the base plate 132 as described next.

Figure 5:
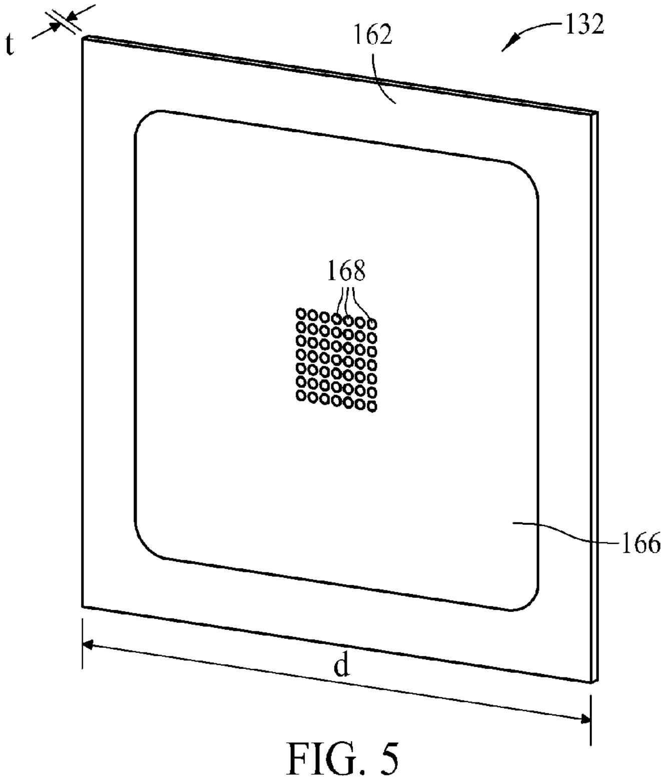
FIG. 5 is a front elevational view of a portion of a varistor sub-assembly for the device shown in FIGS. 1-4.
Figure 6:
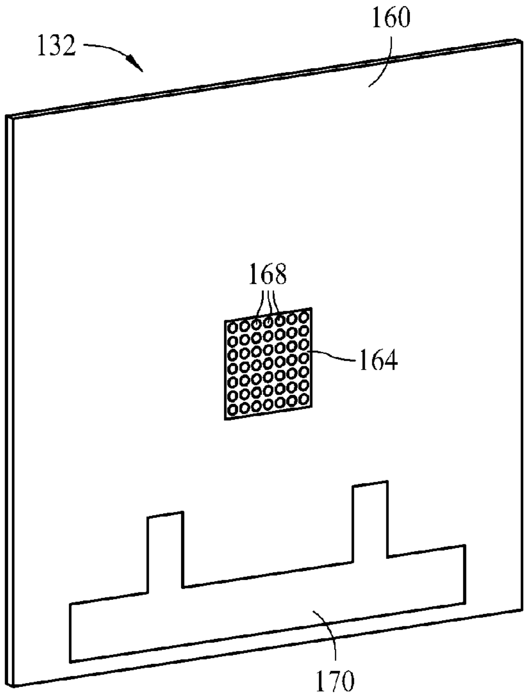
FIG. 6 is a rear elevational view of the portion of the varistor sub-assembly shown in FIG. 5.

The base plate 132, also shown in FIGS. 5 and 6 in rear view and front view, respectively, is a thin element formed from an electrically nonconductive or insulative material into a generally square shape and having opposed faces or sides 160 and 162. In one embodiment, the plate 132 may be fabricated from a ceramic material, and more specifically from alumina ceramic to provide a sound structural base for the varistor element 134 as well as capably withstanding electrical arcing as the device 100 operates as further explained below. Other insulating materials are, of course, known and may be utilized to fabricate the plate 132 in other embodiments.

On the side 160 (shown in FIGS. 5 and 6), the plate 132 is provided with a centrally located and square shaped planar contact 164, which may be formed from conductive material in a plating process or another technique known in the art. On the opposing side 162, the plate 132 is provided with a centrally located and square shaped planar contact 166, which likewise may be formed from conductive material in a plating process or another technique known in the art. Each of the contacts 164, 166 defines a contact area on the respective side 160, 162 of the plate 132, and as shown in the exemplary embodiment illustrated the contact 166 forms a much larger contact area on the side 162 than the corresponding contact area for the contact 164 on the side 160. While square contact areas of different proportion are shown, the contacts 164, 166 need not necessarily be square in other embodiments and other geometric shapes of the contacts 164 may suffice. Likewise, different proportions of the contact areas is not necessarily required and may be considered optional in some embodiments.

As best shown in FIGS. 5 and 6, the insulative plate 132 is further provided with through holes extending completely through the thickness of the plate 132. The through holes may be plated or otherwise filled with a conductive material to form conductive vias 168 interconnecting the contacts 164 and 166 on the respective sides 160 and 162. As such, conductive paths are provided extending from one side 160 of the plate 132 to the other side 162 by virtue of the contacts 164, 166 and the vias 168.

As shown in FIG. 5, the lateral sides of the plate 132 in an exemplary embodiment share a dimension d of about 38 mm, and the plate has a thickness t of about 0.75 to 1.0 mm in the example shown. Other dimensions are, of course, possible and may be adopted.

As shown in FIG. 6, the side 160 of the plate 132 includes, in addition to the contact 164, an anchor element 170 for the short circuit element 140. The anchor element 170 may be a plated or printed element formed on the surface of the side 160, and may be formed from a conductive material. The anchor element 170 is electrically isolated on the surface of the side 160, and serves mechanical retention purposes only as the short circuit current element 140 is installed. While an exemplary shape for the anchor element 170 is shown, various other shapes are possible.

Figure 8:
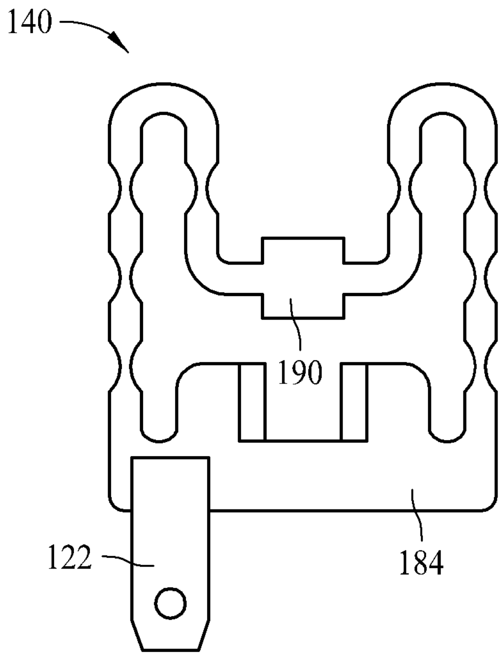
FIG. 8 is a front elevational view of an exemplary short circuit disconnect element for the device shown in FIG. 1-3.

As seen in FIGS. 4, 7 and 8, the short circuit disconnect element 140 generally is a planar conductive element including a rear side 180 and a front side 182 opposing one another. More specifically, the short circuit disconnect element 140 is formed to include an anchor section 184, lateral conductors 186 and 188 extending from the anchor section 184, and a contact section 190 longitudinally spaced from the anchor section 184 but interconnected with the conductors 186, 188. The conductors 186 and 188 extend longitudinally upward from the lateral edges of the anchor section 184 for a distance, turn approximately 180° and extend downwardly toward the anchor portion 184 for another distance, and then turn about 90° to meet and adjoin with the contact section 190. The contact section 190 is formed in the example shown in a square shape having a contact area roughly equal to the contact area for the plate contact 164.

The contact section 190 may be surface mounted to the plate contact 164 using a low temperature solder to form a thermal disconnect junction therebetween, while the anchor section 184 is surface mounted to the plate anchor element 170 using high temperature solder. As a result, the anchor section 184 is effectively mounted and anchored in a fixed position on the side 160 of the plate 132, while the contact section 190 may be moved and detached from the plate contact 164 when the low temperature junction is weakened as further described below.

The conductors 186 and 188 of the short circuit disconnect element 140 are further formed with narrowed sections 192 having a reduced cross sectional area, sometimes referred to as weak spots. When exposed to a short circuit current condition, the weak spots 192 will melt and disintegrate such that the conductors 186 and 188 no longer conduct current, and hence disconnect the varistor element 134 from the power line 124 (FIG. 1). The length of the conductors 186 and 188, which is lengthened by the 180° turns, and also the number and areas of the weak spots, determine a short circuit rating for the conductors 186, 188. The short circuit rating can therefore be varied with different configurations of the conductors 186, 188.

The short circuit disconnect element 140 also includes, as best shown in FIG. 4, a retainer section 194 and rail sections 196 extending out of the plane of the anchor section 184, the conductors 186, 188 and the contact section 190. The retainer section 194 includes an aperture 198 that cooperates with the thermal disconnect element 142 as described below, and the rails 196 serve as mounting and guidance features for movement of the thermal disconnect element 142.

The terminal 122 is shown as a separately provided element from the short circuit disconnect element 140 in the illustrated examples. The terminal 122 is welded to the anchor section 184 in an exemplary embodiment. In another embodiment, however, the terminal 122 could be integrally provided with or otherwise attached to the anchor section 184.

The thermal disconnect element 142 includes, as shown in FIGS. 4 and 7, a nonconductive body 200 fabricated from molded plastic, for example. The body 200 is formed with oppositely extending indication tabs 204 and 206, bias element pockets 208 and 210, and elongated slots 212 and 214 extending longitudinally on the lateral sides thereof. The slots 212 and 214 receive the rails 196 (FIG. 4) when the thermal disconnect element 142 is installed, and the pockets 208 and 210 receive bias elements 216 and 218 in the form of helical compression springs.

The indication tab 206 is inserted through the aperture 198 (FIG. 4) in the retainer section 194 of the short circuit disconnect element 140, and the springs 216, 218 seat on the upper edges of the rails 196, (as further shown in FIG. 14) and provide an upwardly directed bias force against the retainer section 194. In normal operation, and because the contact section 190 is soldered to the plate contact 164 (FIG. 7), the bias force is insufficient to overcome the soldered junction and the contact section 190 is in static equilibrium and remains in place. When the soldered junction is weakened, however, such as in a low to moderate but sustained over-voltage condition, the bias force acting on the retainer section 194 overcomes the weakened soldered junction and causes the contact section 190 to be moved away from the plate contact 164.

FIG. 8 is a front assembly view of a manufacturing step for the device 100 wherein the terminal 122 is welded to the anchor section 184 of the short circuit disconnect element 140. Secure mechanical and electrical connection between the short circuit disconnect element 140 and the terminal 122 is therefore assured.

Figure 9:
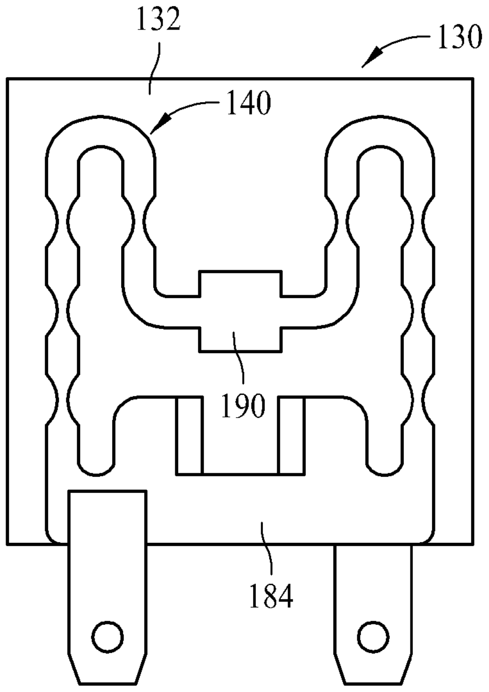
FIG. 9 is a front elevational view of a soldered assembly including the short circuit disconnect element of FIG. 8.

FIG. 9 shows the short circuit disconnect element 140 mounted to the varistor assembly 130. Specifically, the contact section 190 is surface mounted to the plate contact 164 (FIGS. 6 and 7) using a low temperature solder and the anchor section 184 is mounted to the plate anchor element 170 (FIGS. 6 and 7) using high temperature solder.

Figure 10:
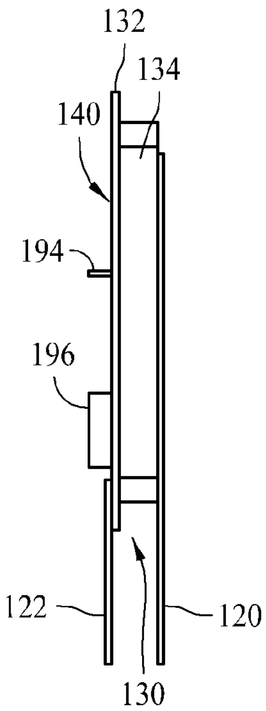
FIG. 10 is a side elevational view of the assembly shown in FIG. 9.
Figure 11:
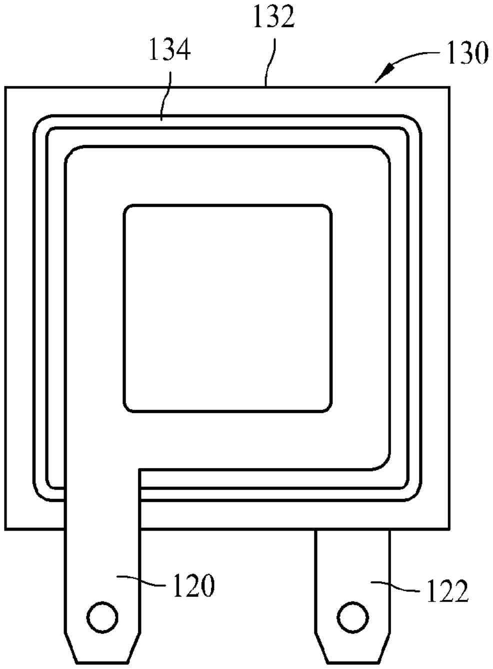
FIG. 11 is a rear elevational view of the assembly shown in FIG. 9.

FIGS. 10 and 11 also show the terminal 120 surface mounted to the varistor element 134 using a high temperature solder. As best shown in FIG. 10, the varistor 134 is sandwiched between the terminal 120 and one side of the plate 132, and the plate 132 is sandwiched between the varistor 134 and the short circuit disconnect element 140. Because of the direct, surface mount engagement of the components, a compact assembly results, giving the device 100 a considerably reduced thickness T (FIG. 1) in comparison to known surge suppression devices.

Figure 12:
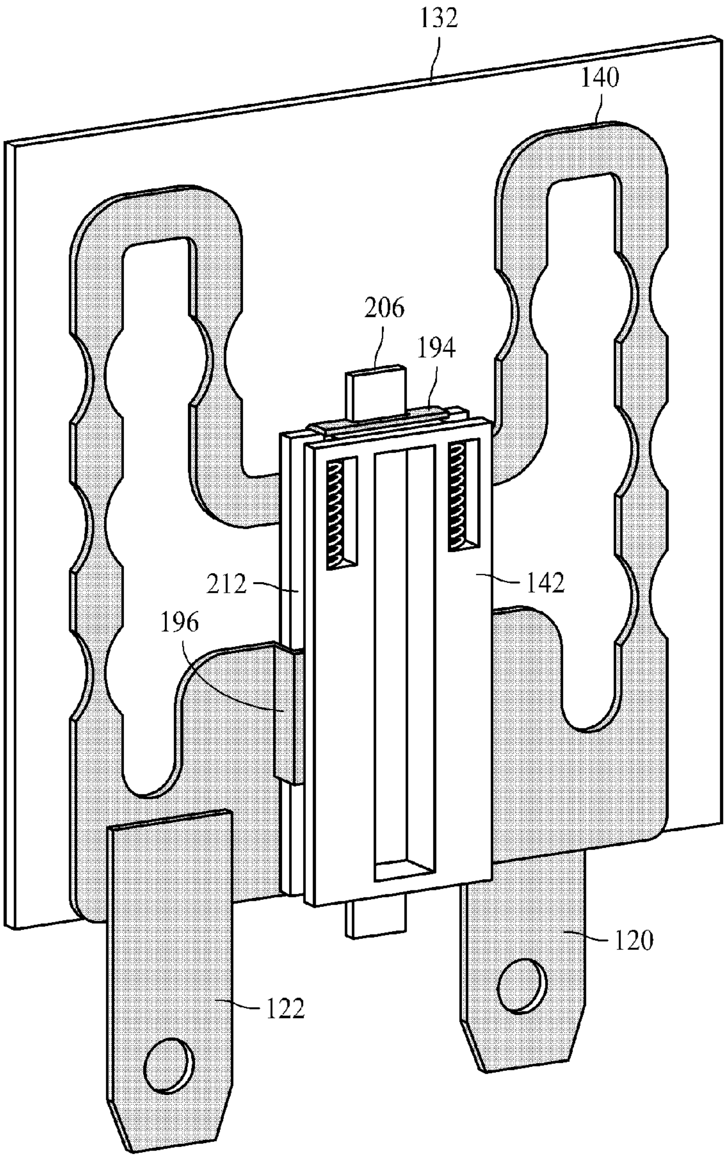
FIG. 12 is a front perspective assembly view of a portion of assembly shown in FIG. 9 with a thermal disconnect element.
Figure 13:
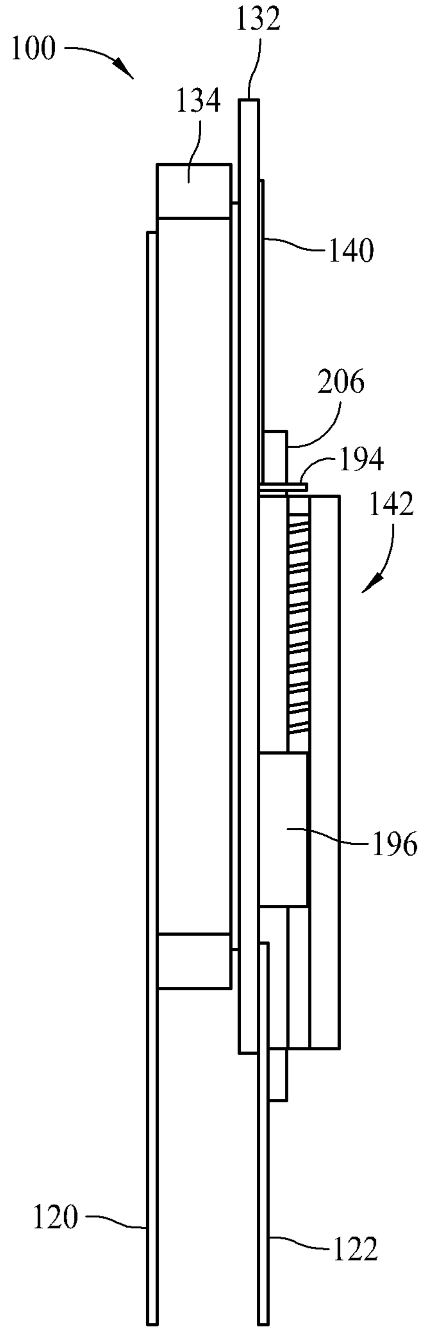
FIG. 13 is a side elevational view of the assembly shown in FIG. 12.

FIGS. 12 and 13 show the thermal disconnect element 142 installed to the assembly shown in FIG. 9. The tab 206 is inserted through the retainer section 194 of the short circuit disconnect element 140, and the slots 212, 214 are received on the rails 196 (also shown in FIG. 4). The bias elements 216, 218 (FIG. 4) are compressed by the thermal disconnect element 142 when installed.

Figure 14:
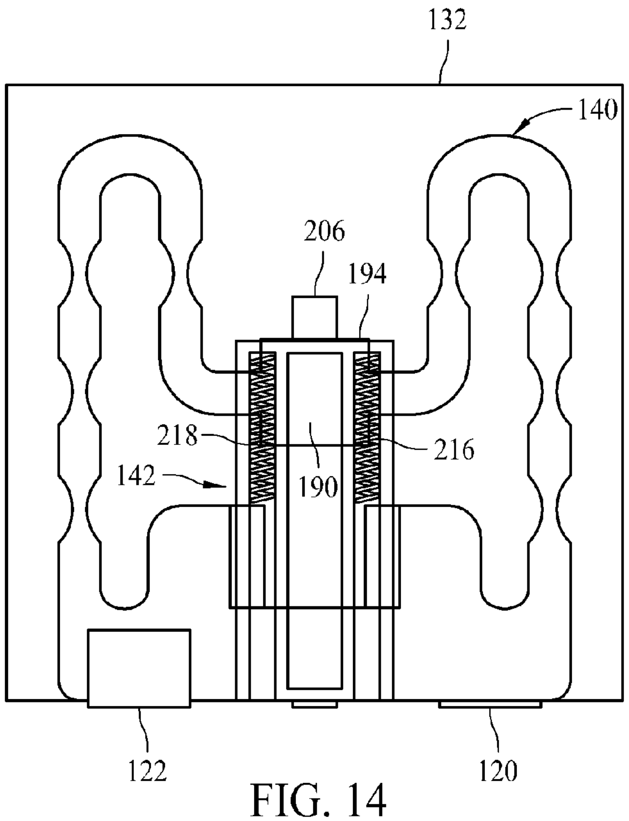
FIG. 14 illustrates the device including the short circuit current element and the thermal disconnect element in normal operation.

FIG. 14 illustrates the device 100 with the short circuit current element 140 and the thermal disconnect element 142 in normal operation. The bias elements 216 and 218 of the thermal disconnect element 142 provide an upwardly directed bias force (indicated by Arrow F in FIG. 15). In normal operation, however, the bias force F is insufficient to dislodge the soldered junction of the contact section 190 of the short circuit disconnect element 140 to the plate contact 164 (FIGS. 6 and 7).

Figure 15:
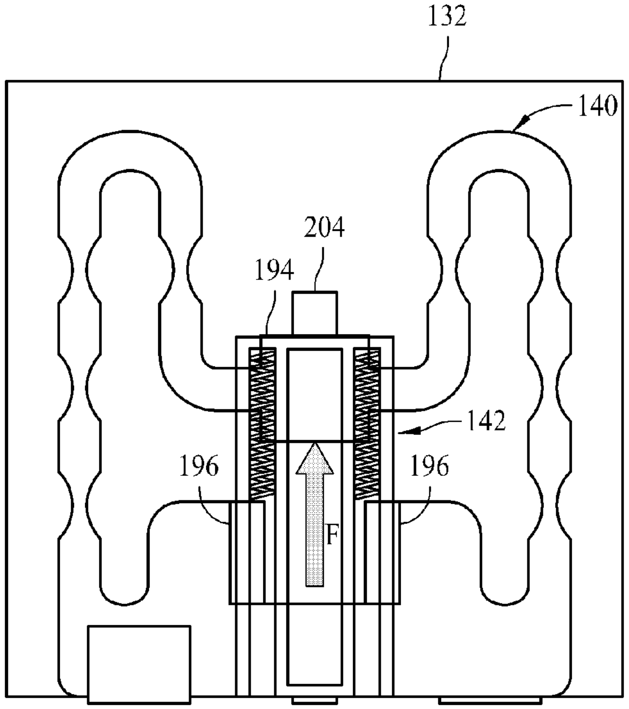
FIGS. 15 and 16 illustrate a first disconnection mode of the device wherein the thermal disconnect element operates to disconnect the varistor.
Figure 16:
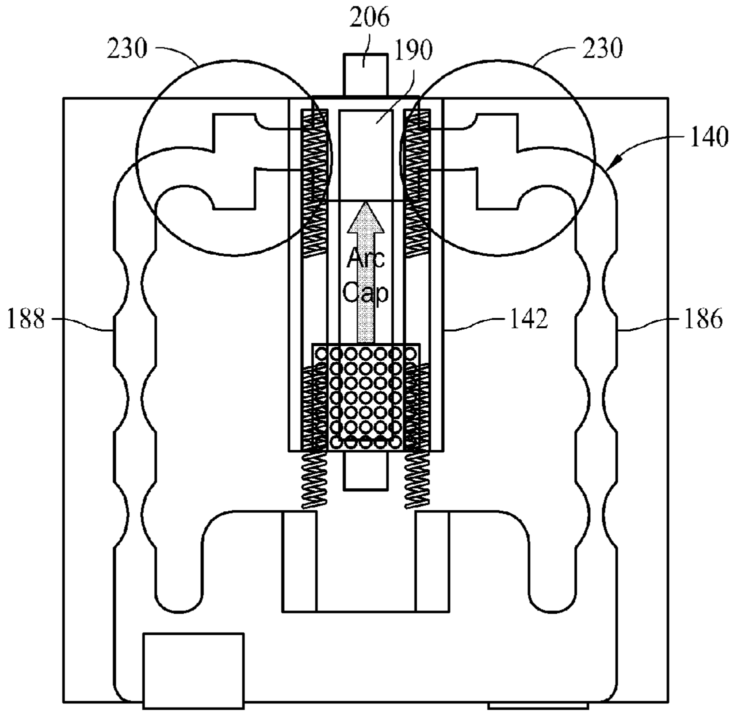

FIGS. 15 and 16 illustrate a first disconnection mode of the device wherein the thermal disconnection operates to disconnect the varistor 134.

As shown in FIGS. 15 and 16, as the soldered junctions weakens when the varistor element heats and becomes conductive in an over-voltage condition, the bias force F counteracts the weakened soldered junction to the point of release, wherein as shown in FIG. 16 the bias elements cause the thermal disconnect element 142 to become displaced and moved axially in a linear direction upon the rails 196. Because the tab 206 of the thermal disconnect element 142 is coupled to the retainer section 194 of the short circuit current element 140, as the thermal disconnect element 142 moves so does the retainer section 194, which pulls and detaches the contact section 190 from the plate contact 164. The electrical connection through the plate 132 is therefore severed, and the varistor 134 becomes disconnected from the terminal 122 and the power line 124 (FIG. 1).

As the contact section 190 is moved, an arc gap is created between the original soldered position of the contact section 190 and its displaced position shown in FIG. 16. Any electrical arcing that may occur is safely contained in the gap between the insulating plate 132 and the thermal disconnect element 142, and is mechanically and electrically isolated from the varistor element 134 on the opposing side of the insulating plate 132.

The bias elements generate sufficient force on the thermal disconnect element 142 once it is released to cause the conductors 186, 188 to fold, bend or otherwise deform proximate the contact section 190, as indicated in the regions 230 in FIG. 16, as the thermal disconnect element 142 moves. Because the conductors 186, 188 are formed as thin, flexible ribbons of conductive material (having an exemplary thickness of 0.004 inches or less), they deform rather easily once the thermal disconnect element 142 begins to move. As shown in FIG. 16, the thermal disconnect element 142 may be moved upwardly along a linear axis until the indicating tab 206 projects through the upper side 108 of the housing 102 (FIG. 1) to provide visual indication that the device 100 has operated and needs replacement.

Figure 17:
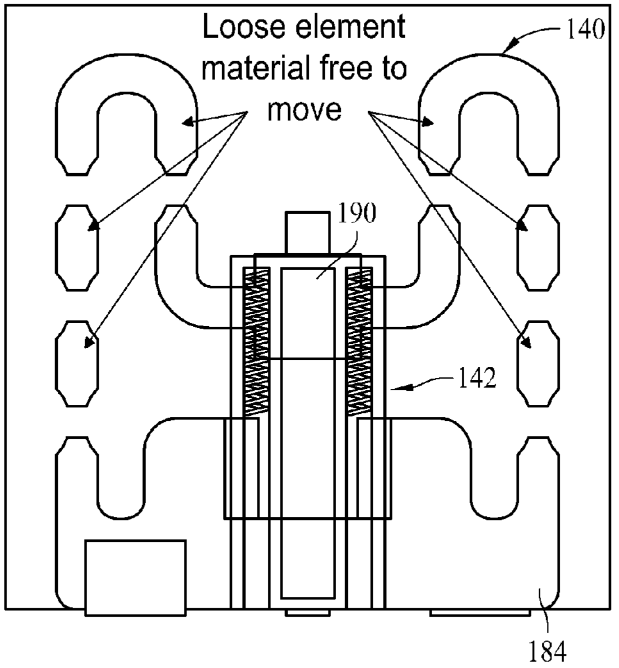
FIG. 17 illustrates a second disconnection mode of the device wherein the short circuit disconnect element has operated to disconnect the varistor.

FIG. 17 illustrates a second disconnection mode of the device 100 wherein the short circuit disconnect element 140 has operated to disconnect the varistor 134 from the terminal 122 and the power line 124 (FIG. 1). As seen in FIG. 17, the conductors 186 and 188 have disintegrated at the weak spots 192 (FIGS. 4 and 7) and can no longer conduct current between the anchor section 184 and the contact section 190 of the short circuit disconnect element 140. Electrical contact with the plate contact 164 and the conductive vias 168 to the other side of the plate 132 where the varistor element 134 resides is therefore broken, and the varistor 134 accordingly is no longer connected to the terminal 122 and the power line 124. The short circuit disconnect element 140 will operate in such a manner in extreme over-voltage events in much less time than the thermal disconnect element 142 would otherwise require. Rapid failure of the varistor element 134 before the thermal protection element 142 has time to act, and also resultant short circuit conditions, are therefore avoided.

Figure 18:
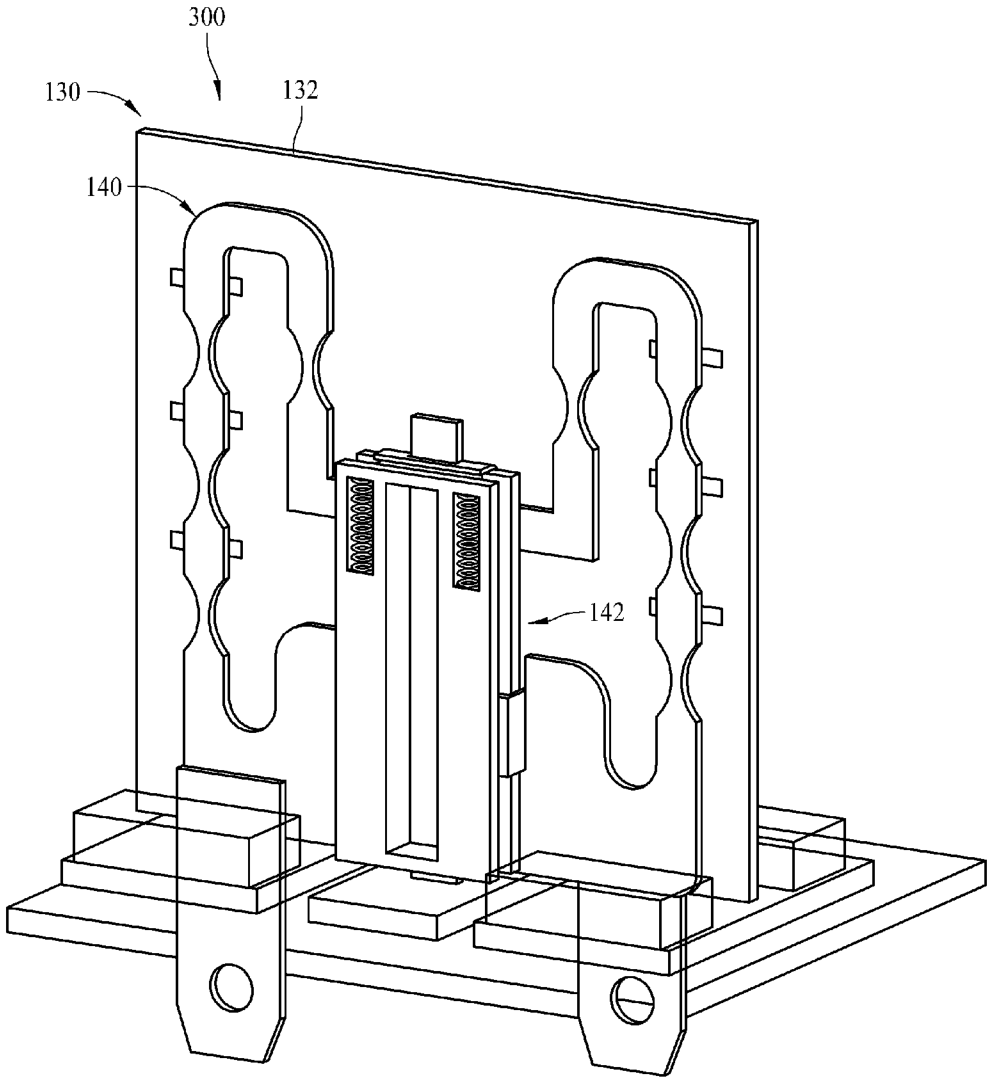
FIG. 18 is a partial front perspective view of another exemplary surge suppression device in normal operation.
Figure 19:
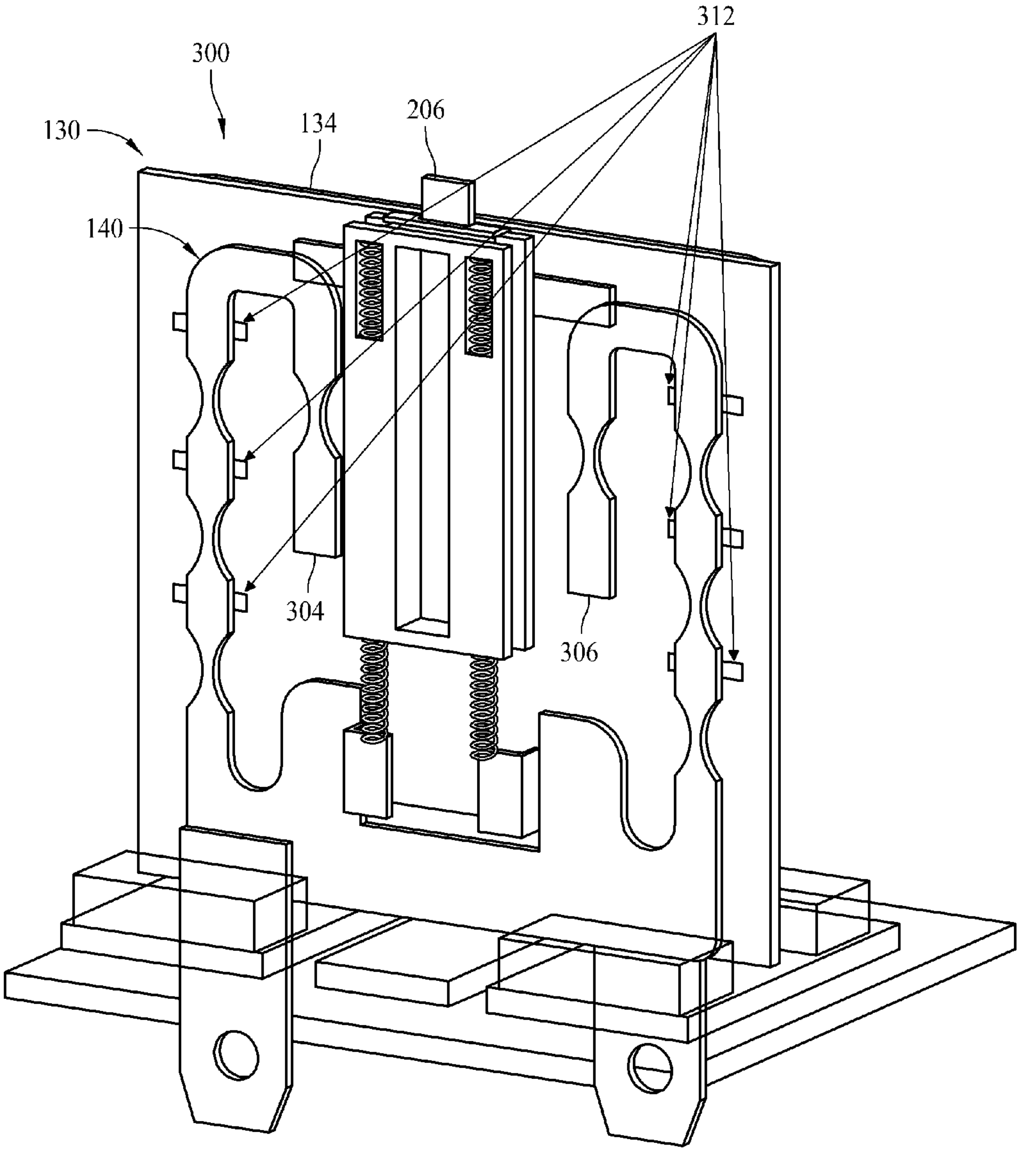
FIG. 19 is a similar view to FIG. 18 but showing the thermal disconnect element having operated to disconnect the varistor.
Figure 20:
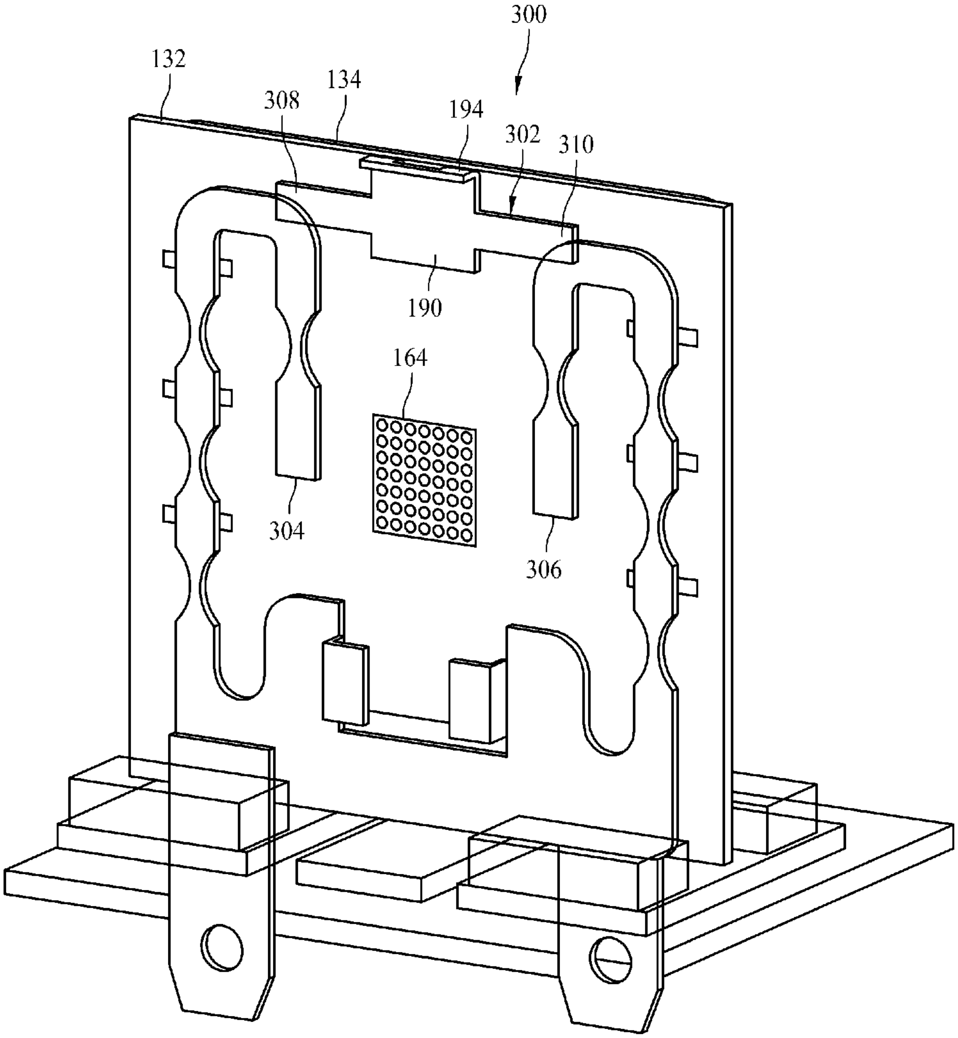
FIG. 20 is a view similar to FIG. 19 with the thermal disconnect element not shown.

FIGS. 18-20 illustrate another exemplary embodiment of a surge suppression device 300 that is similar in many aspects to the device 100 described above. Common features of the devices 300 and 100 are therefore indicated with like reference characters in FIGS. 18-20. As the common features are described in detail above, no further discussion therefore is believed to be necessary.

Unlike the device 100, the varistor assembly 130 is further provided with a separable contact bridge 302 (best shown in FIG. 20) that is carried by the thermal disconnect element 142. Opposing ends 308, 310 of the contact bridge 302 are respectively soldered to distal ends 304, 306 of the short circuit element 140 with low temperature solder. The contact section 190 of the bridge 302 is likewise soldered to the contact 164 (FIG. 7) of the base plate 132 with low temperature solder.

In normal operation of the device 300, as shown in FIG. 18, the low temperature solder joints connecting the ends 308, 310 and the contact section of the bridge 302 are sufficiently strong to withstand the flow of electrical current through the device 100 as discussed above.

As the low temperature solder junctions are weakened when the varistor element heats and becomes conductive in an over-voltage condition, the bias force F counteracts the weakened soldered junctions to the point of release, and the ends 308, 310 and contact section 190 of the bridge 302 separate from the ends 304, 306 of the short circuit element 140 and the contact 164 of the base plate 132. As this occurs, and as shown in FIGS. 19 and 20, the bias elements of the thermal disconnect element 142 cause the thermal disconnect element 142 to become displaced and moved axially in a linear direction. Because the tab 206 (FIG. 19) of the thermal disconnect element 142 is coupled to the retainer section 194 (FIG. 20) of the contact bridge 302, as the thermal disconnect element 142 moves so does the contact bridge 302. The electrical connection through the plate 132 via the contact 164 is therefore severed, and the varistor 134 accordingly becomes disconnected from the terminal 122 and the power line 124 (FIG. 1). Likewise, the electrical connection between the ends 308, 310 of the contact bridge 302 and the ends 304, 306 of the short circuit element 140 are severed. This result is sometimes referred to as a "triple break" feature wherein three points of contact are broken via three different low temperature solder joints. The triple break action provides capability of the device 300 to perform with higher system voltages than the device 100.

Short circuit operation of the device 300 is substantially similar to the device 100 described above. The device 300 includes, however, solder anchors 312 in the varistor assembly 130 that allow the short circuit element 140 to withstand, for example, high energy impulse currents without deforming or otherwise compromising operation of the device 300. Such high energy impulse currents may result from testing procedures or from current surges that are otherwise not problematic to an electrical system and are not of concern for purposes of the device 300. The solder anchors 312 bond the short circuit current element 140 to the base plate 132 without creating electrical connections. The solder anchors 312 as shown may be located between adjacent weak spots in the short circuit current element, or at other locations as desired.

Figure 21:
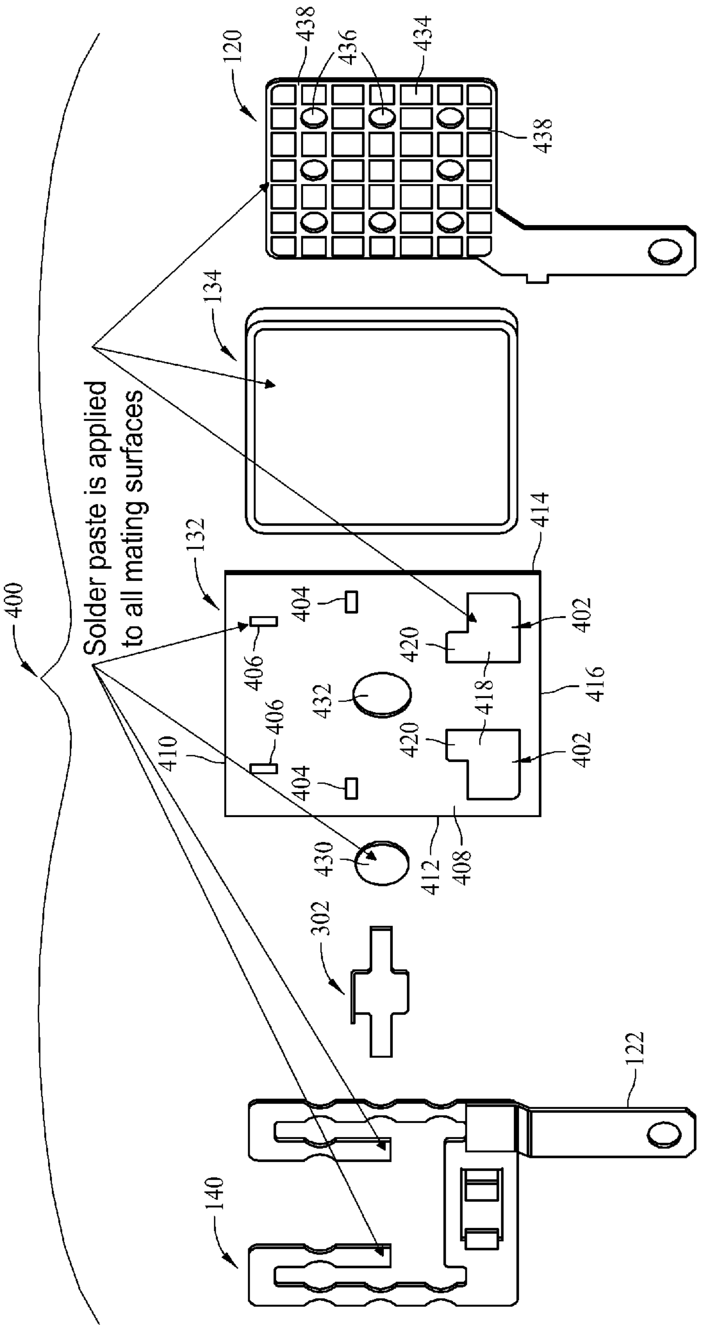
FIG. 21 is a partial exploded view of another embodiment of an exemplary surge suppression device.

FIG. 21 is a partial exploded view of another embodiment of an exemplary surge suppression device 400 offering still other features and advantages. The components shown in FIG. 21 may be associated with a housing, such as the housing 102 shown and described above with similar effect.

The surge suppression device 400 includes the short circuit disconnect element 140, the separable contact bridge 302, the base plate 132, the varistor element 134 and the terminal 120.

The base plate 132 includes a number of distinct anchor elements 402, 404, 406 that may be plated or printed on the surface 408 of the plate base 132 from a conductive material. The anchor portions 402, 404, 406 are each provided in opposing, spaced apart pairs, with the exemplary anchor elements 406 arranged as follows in one embodiment. The anchor elements 406 are generally elongated elements extending parallel to one another along a first axis (e.g., a vertical axis as shown in FIG. 21) near a top edge 410 of the plate 132. The anchor elements 404 are generally elongated elements extending parallel to one another along a second axis (e.g., a horizontal axis as shown in FIG. 21) near the opposed lateral side edges 412, 414 of the plate 132. The anchor elements 402 are shown as larger elements near the bottom corners of the plate 132 where the side edges 412, 414 intersect with the bottom edge 416 of the plate 132. Further, each of the anchor elements 402 generally rectangular pads with vertical extensions or tabs 420. The respective anchor elements 402, 404 and 406 are electrically isolated on the surface 408 of the base plate 132, but provide various mechanical retention surfaces for attaching the short circuit disconnect element 140 to various locations on the plate 132 via known techniques such as soldering. While exemplary anchor elements 402, 404 and 406 are shown, others are possible, in addition to or in lieu of the elements 402, 404 and 406. Various shapes and geometries, as well as varying dimensions and orientation of anchor elements may be utilized as desired.

Further, in lieu of the contact vias 168 (FIGS. 5 and 6) providing electrical paths through the base plate 132, the device 400 includes a solid slug 430 that is received in a central through-hole or aperture 432 formed in the plate 132. In the exemplary embodiment shown, the slug 430 is a generally disk-shaped element formed with a thickness approximately equal to the thickness of the plate 132, and the through hole 432 is a generally circular opening having an inner dimension slightly larger than the outer diameter of the slug 430. Various other alternative shapes of the slug 430 and the through hole 432 are possible in further and/or alternative embodiments.

The slug 430 in contemplated embodiments may be fabricated from a solid (i.e., continuous structure without openings formed therein), conductive material such as silver, copper or other suitable materials known in the art. The slug 430 may be mechanically secured to the plate 132 in the through hole 432 using known techniques such as soldering. The slug 430 provides a relatively lower cost option for the assembly relative to the contact vias 168 described above without compromising the performance of the device 400. The contact bridge 302 is soldered to the slug 430 after its assembly to the base plate 132, and the solder is selected to release the contact bridge 302, with assistance from the thermal disconnection element 142 as described above, in response to predetermined electrical conditions. While one slug 430 is shown in the illustrated example, it is contemplated that multiple slugs may be used if desired to create additional contact surfaces and electrical connections through the plate 132, albeit with greater expense and a more complicated assembly.

The terminal 120 as shown in FIG. 21 further includes a generally rectangular mounting section 434 provided with a number of openings 436. The mounting section 434 provides a much larger surface area for connection with the varistor element 134 than, for example, the embodiment shown in FIG. 3. In the example shown, the mounting section 434 is further provided with a grid-like surface including elevated mounting surfaces separated by depressions or grooves 438. Further, the grooves 438 and openings 436 provide a degree of ventilation to avoid excessive heat build-up. Because of the increased contact surface area, the terminal 120 can be easier to assemble while providing an improved reliability in the electrical connection to the varistor element 134.

Figure 22:
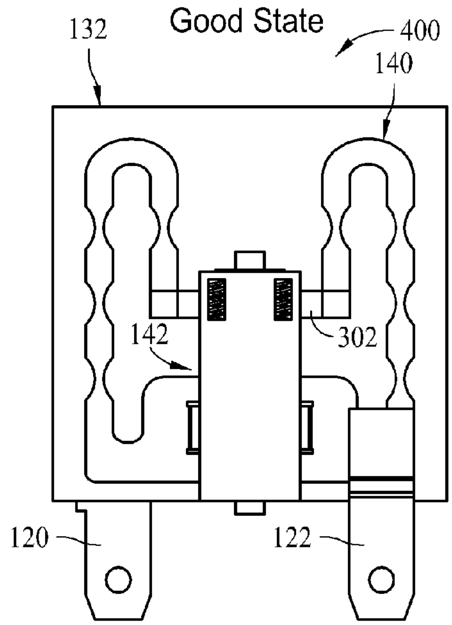
FIG. 22 is a first assembly view of the device shown in FIG. 21 with the thermal disconnect element in a normal operating condition.

FIG. 22 is a first assembly view of the device 400 with the thermal disconnect element 142 coupled thereto in the manner explained above. FIG. 22 represents a normal operating condition wherein the electrical connection between the terminals 120 and 122 and the varistor element 134 is complete and the surge suppression capability of the device 400 is available and operable to address electrical over-voltage conditions, sometimes referred to as surge conditions.

Figure 23:
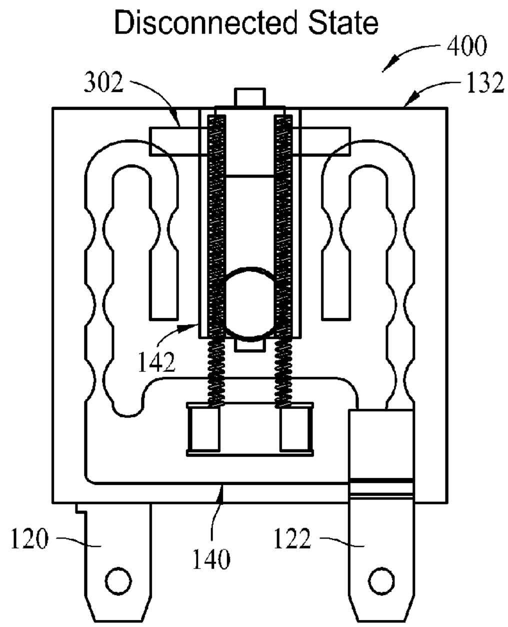
FIG. 23 is a view similar to FIG. 22 but showing the thermal disconnect element having operated to disconnect the varistor.
Figure 24:
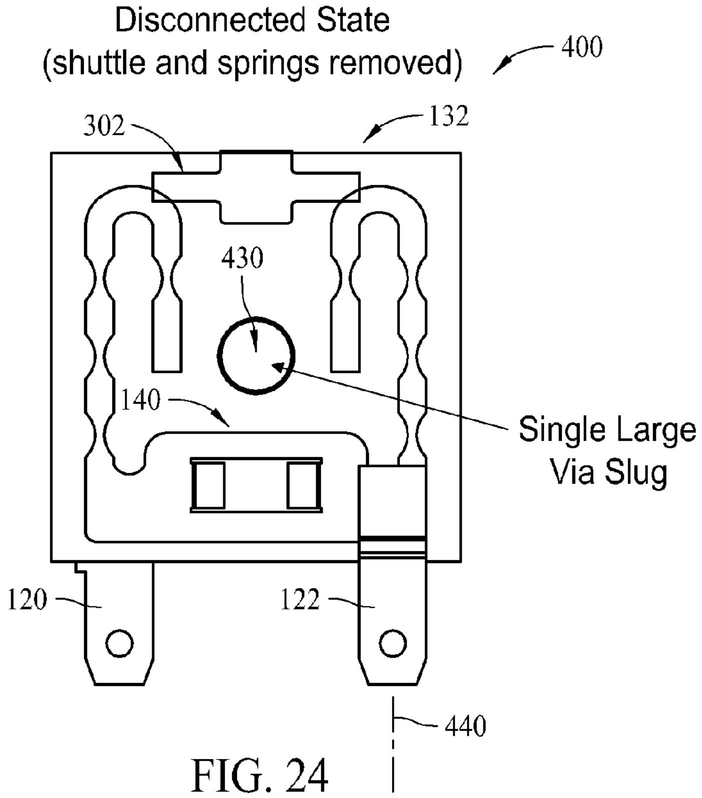
FIG. 24 is a view similar to FIG. 23 but with the thermal disconnect element removed.

FIG. 23 shows the thermal disconnect element 142 having operated to disconnect the varistor element 134 (FIG. 21) coupled to the opposite side of the base plate 132. As shown in FIGS. 23 and 24 (wherein the thermal disconnect element 142 is not shown), the contact bridge 302 has been released from the slug 430 and electrical connection between the terminals 120 and 122 has been opened or disconnected. The thermal disconnect element 142, that carries the contact bridge 302, is movable along an axis parallel to the longitudinal axis 440 of the contact blades of the terminals 120 and 122 from the normal condition (FIG. 22) to the operated position (FIGS. 23 and 24).

Figure 25:
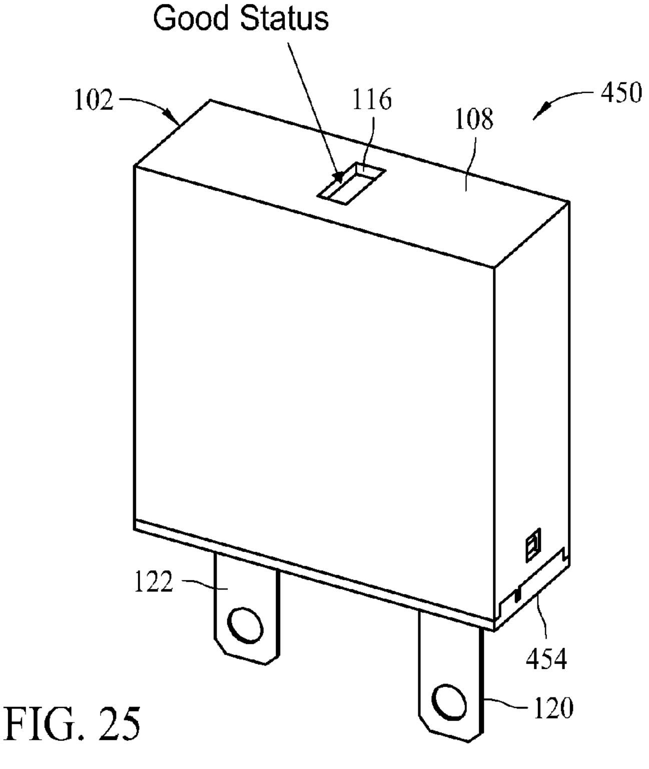
FIG. 25 is a perspective view of another embodiment of an exemplary surge suppression device.
Figure 28:
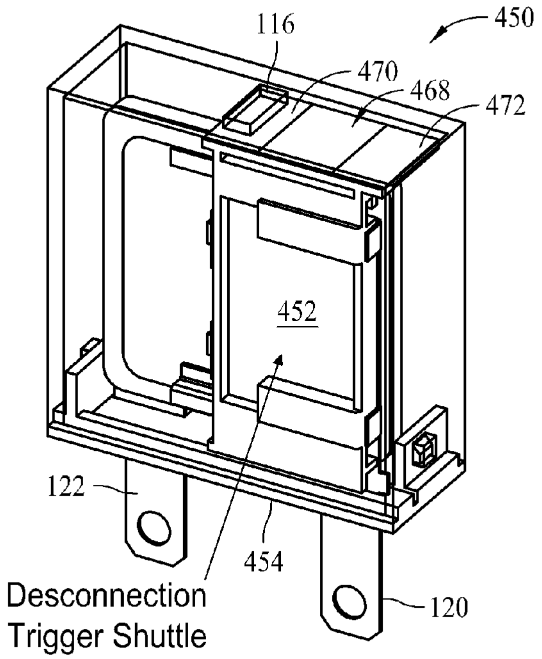
FIG. 28 is a perspective view of the device shown in FIG. 27.
Figure 29:
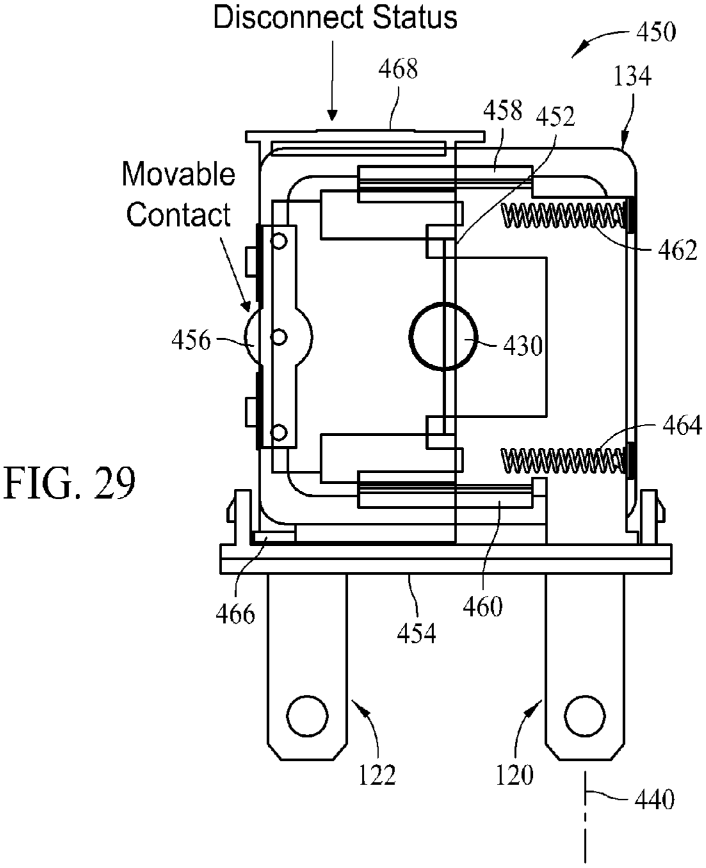
FIG. 29 is a view similar to FIG. 27 but showing the thermal disconnect element having operated to disconnect the varistor.
Figure 30:
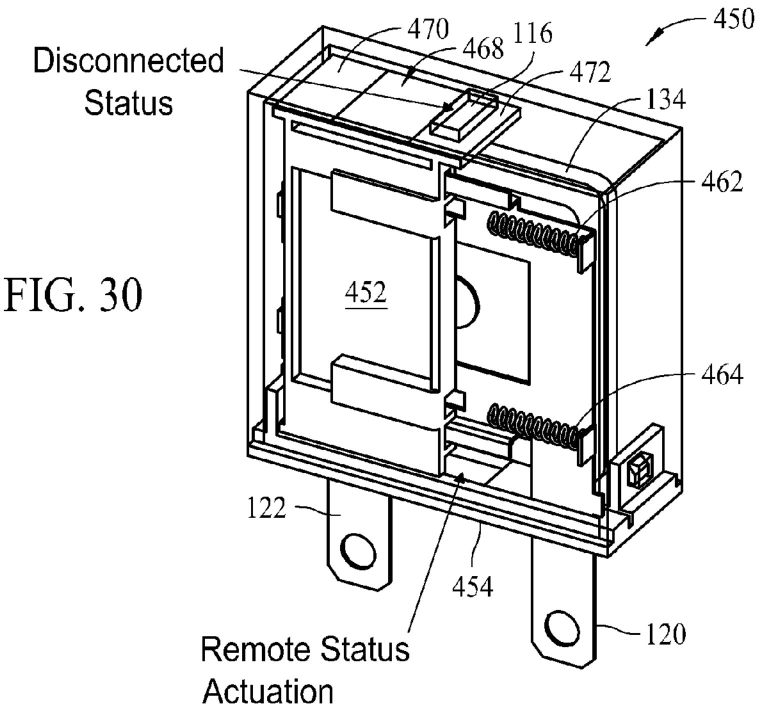
FIG. 30 is a perspective view of the device shown in FIG. 29.
Figure 31:
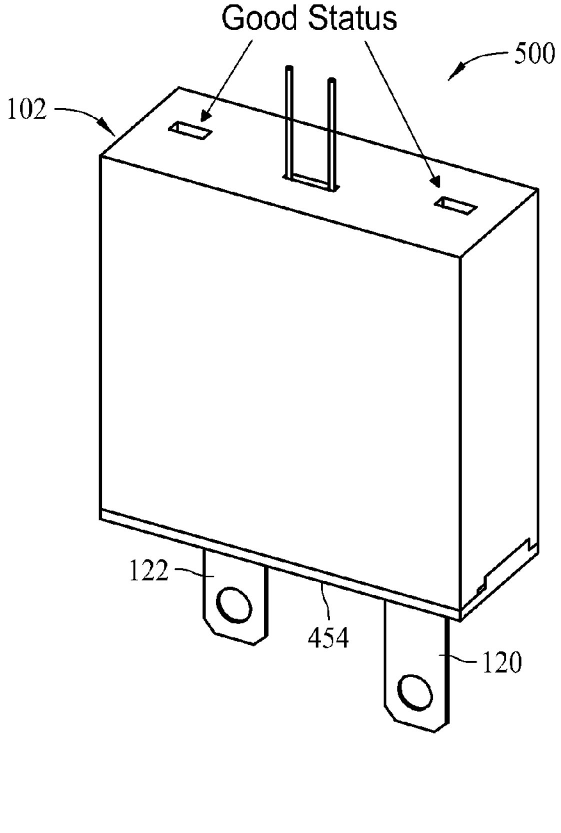
FIG. 31 is a perspective view of another embodiment of an exemplary surge suppression device.
Figure 32:
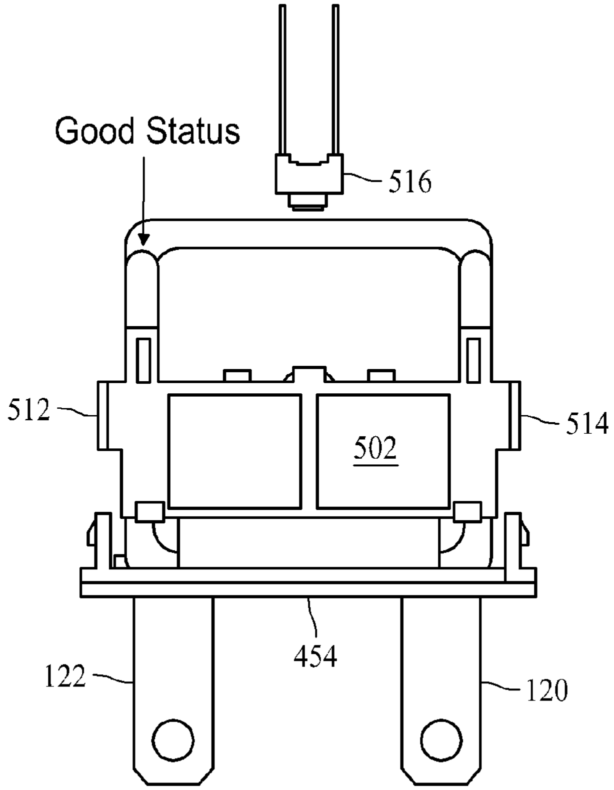
FIG. 32 is a partial assembly view of the device shown in FIG. 31 with a thermal disconnect element in a normal operating condition.
Figure 33:
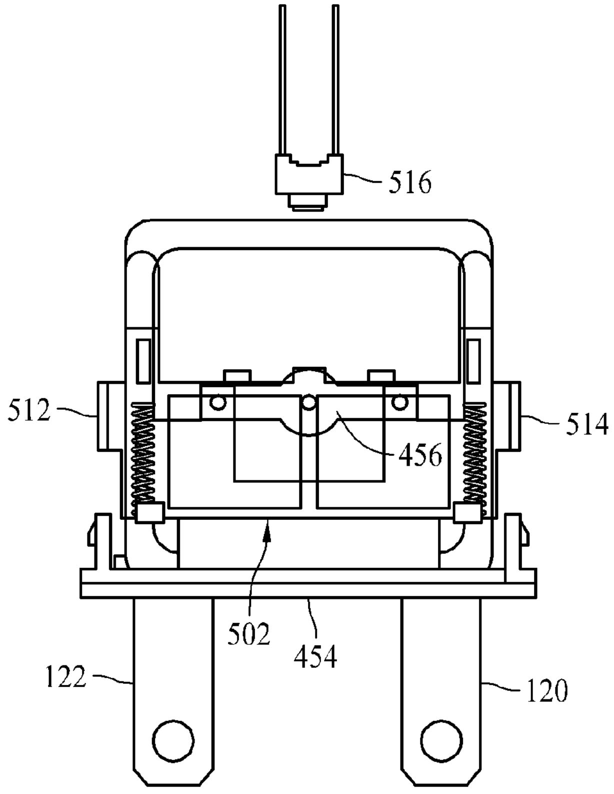
FIG. 33 is a view similar to FIG. 32 but showing internal construction of the thermal disconnect element.

FIGS. 25-30 are various views of another embodiment of an exemplary surge suppression device 450 that is similar in many aspects to the embodiments described above, but as shown in FIGS. 26-28 the surge suppression device 450 includes an alternative thermal disconnect element 452 and an alternative indication structure to convey whether the device 450 is in a normal operating condition or a disconnected condition.

Figure 26:
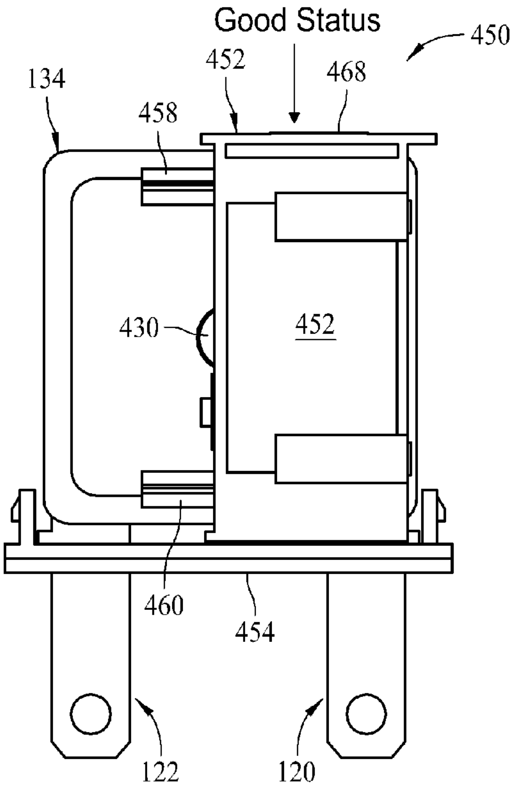
FIG. 26 is a partial assembly view of the device shown in FIG. 25 with a thermal disconnect element in a normal operating condition.
Figure 27:
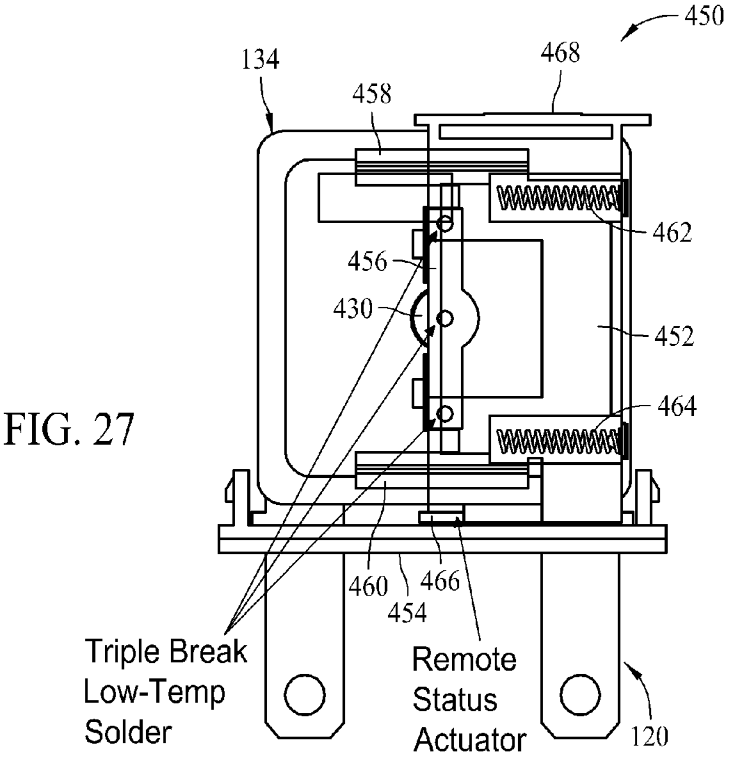
FIG. 27 is a view similar to FIG. 26 but showing internal construction of the thermal disconnect element.

FIG. 25 is a perspective view of the completed device 450. FIG. 26 is a partial assembly view of the device 450 illustrating the thermal disconnect element 452 in a normal operating condition. FIG. 27 is a view similar to FIG. 26 but showing internal construction of the thermal disconnect element 452. FIG. 28 is a perspective view of the device 450. FIG. 29 is a view similar to FIG. 27 but showing the thermal disconnect element having operated to disconnect the varistor element 134. FIG. 30 is a perspective view of the device 450.

The thermal disconnect device 452, as shown in FIGS. 25-30, resides on a nonconductive base 454 that is interfitted with the housing 102 to form an enclosure around the varistor assembly and internal components. The varistor element 134, including the slug 430 is coupled to the terminal 122 on one side and the thermal disconnect element 452 is coupled to the opposing side of the varistor element 134 as shown in FIGS. 26-29. The varistor element 134 in this embodiment may be an epoxy encapsulated varistor element such that the base plate 132 in the previous embodiments may be omitted. Alternatively, the base plate 132 can be included with a non-epoxy encapsulate varistor element.

The thermal disconnect element 452 carries a separable contact bridge 456, and is movable on rails 458, 460 from the normal or connected position (FIG. 26) wherein the contact bridge completes the electrical connection through the varistor element 134 and the disconnected position (FIG. 29) wherein the contact bridge 456 is released from the slug 430 and electrical connection to the varistor element 134 is broken. Like some of the embodiments above, the separable contact bridge 456 is soldered with low temperature solder at three distinct locations, and provides the "triple-break" feature described above. Unlike the foregoing embodiments, the thermal disconnect element 452 is movable along an axis transverse to the longitudinal axis 440 (FIG. 29) of the contact blades of the terminals 120 and 122. Thus, instead of moving parallel to the axis 440 as in the embodiments described above, the thermal disconnect element 452 moves along an axis perpendicular to the axis 440 of the terminals. Alternatively stated, the thermal disconnect element 452, instead of moving upwardly away from the connecting terminals of the devices as described above, moves side-to-side within the housing 102.

The thermal disconnect element 452 may be formed from a nonconductive material such as plastic according to known techniques, and may be biased toward the disconnected position with a pair of bias elements 462, 464 such as coil springs. Various adaptations are possible, however, using fewer or greater bias elements as well as different types of bias elements.

The thermal disconnect element 452 in the embodiment shown is dimensioned to be larger than the varistor element 134 in a direction parallel to the axis 440, and is smaller than the varistor element 134 in the direction perpendicular to the axis 440. That is, the height of the thermal disconnect element 452 is larger than the corresponding height of the varistor element 134 as shown in FIGS. 26-29, but the width of the thermal disconnect element 452 is smaller than the corresponding width of the varistor element 134 as shown in FIGS. 26-29. A remote status actuator 466 may be mounted to and carried by the thermal disconnect element 452 at a location between the varistor element 134 and the housing base 454, and an indicating surface 468 may be mounted to and carried by the thermal disconnect element 452. The remote status actuator 466 and the indicating surface 466 may be provided separately or integrally with the thermal disconnect element 452, and in the example shown both the actuator 466 and the indicator surface 468 extend in planes perpendicular to the plane of the varistor element 134. When the device 450 operates, the remote status actuator 466 and the indicator surface 468 move with the thermal disconnect element, and respectively trip a microswitch or another element located on the housing base 454 to generate a signal for remote monitoring purposes, while providing local indication at the top of the device 450.

As best seen in FIGS. 28 and 30, the indicator 468 is provided with first and second colors on opposing ends 470 and 472 thereof. When the thermal disconnect element 452 is in the normal operating position, the first end 470 is positioned to be seen through an aperture 116 formed in the housing 102. When the thermal disconnect element 452 is in the disconnected position, however, the indicator 468 is moved such that the second end 472 is positioned to be seen through the aperture 116. Thus, by providing the first and second end 470, 472 with contrasting colors, one can easily see whether the device has operated or not simply by visually inspecting the indicator 468 through the aperture 116. The color revealed will indicate the state of the device 450. In other embodiment, graphics, symbols and other non-color indicia may be used with similar effect to indicate the state of the device in lieu of color-coded elements as described.

The housing base 454 may, as shown in FIG. 30, include an opening that may accommodate a portion of a microswitch or other element to be actuated by the remote status actuator 466 as the thermal disconnect element 452 moves from the normal position to the disconnect position.

FIGS. 31-36 illustrate various views of another embodiment of an exemplary surge suppression device 500 that is similar in some aspects to the embodiments described above, but includes a further alternative thermal disconnect element 502 and alternative indication features.

Figure 34:
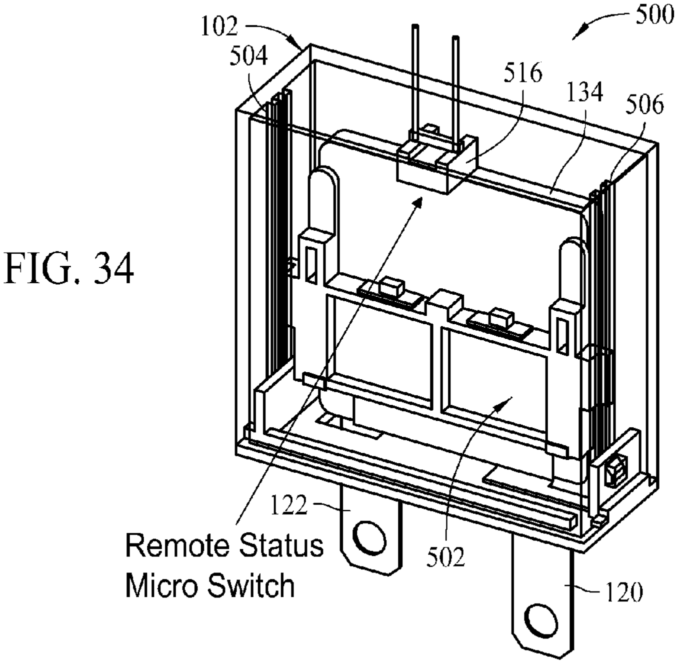
FIG. 34 is a perspective view of the device shown in FIG. 27.
Figure 35:
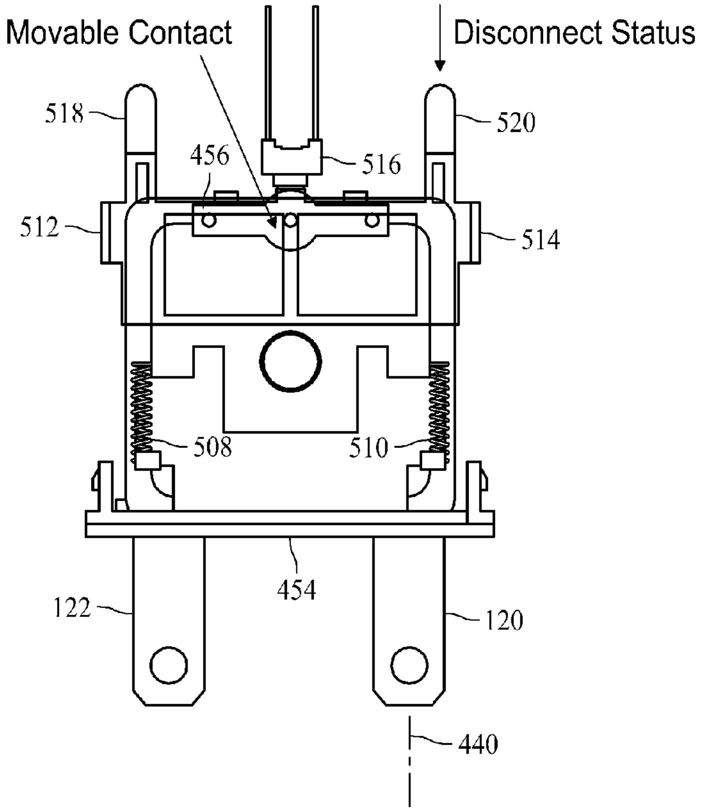
FIG. 35 is a view similar to FIG. 33 but showing the thermal disconnect element having operated to disconnect the varistor.
Figure 36:
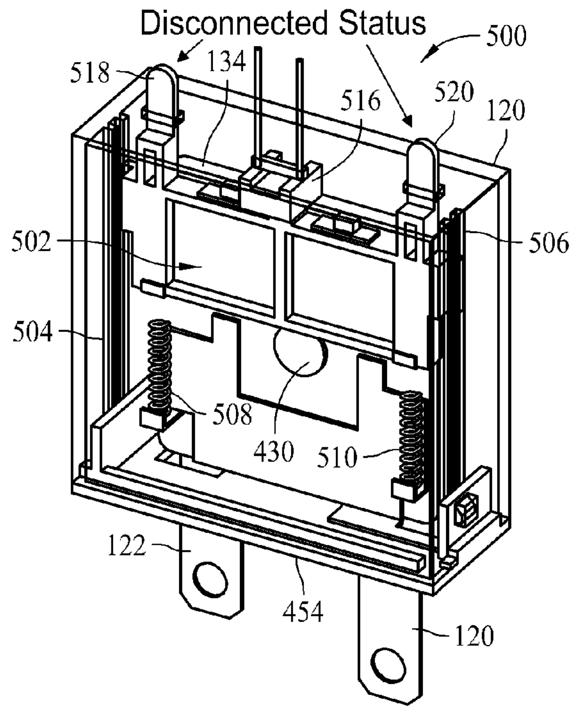
FIG. 36 is a perspective view of the device shown in FIG. 35.

The device 500 is similar to the device 450 described above, but includes a thermal disconnect element 502 arranged to move along an axis parallel to the axis 440 of the terminals between the normal operating position (FIGS. 33-34) and the disconnected position (FIGS. 35 and 36). The thermal disconnect element 502 is slidable in channels or rails 504, 506 formed on the interior side surfaces of the housing 102 (FIGS. 34 and 36). Bias elements 508, 510 such as coil springs cooperate with the thermal disconnect element 502 to facilitate release of the contact bridge 456 from the slug 430 to disconnect the varistor element 134. Extensions 512, 514 are formed on the lateral sides of the thermal disconnect element 502 that cooperate with the rails 504, 506 to guide the thermal disconnect element 502 as it is moved by the force of the bias element 508, 510 as the device 500 operates.

A microswitch 516 may be provided at a location interior to the housing 102 at a location above the varistor element 134. The microswitch 516 may be actuated by the thermal disconnect element 502 as it operates, as shown in FIGS. 35 and 36. Local indicator tabs 518, 520 may also be provided on the thermal disconnect element 502, and the tabs 518, 520 are projected through openings in the housing 102 as the thermal disconnect element 502 assumes the disconnected position. In the normal operating position, however, the tabs 518, 520 are entirely contained interior to the housing 102 and cannot be seen. As such, one can know whether the device 500 has operated or not by the presence (or absence) of the indicator tabs 518, 520 upon visual inspection of the device 450.

Figure 37:
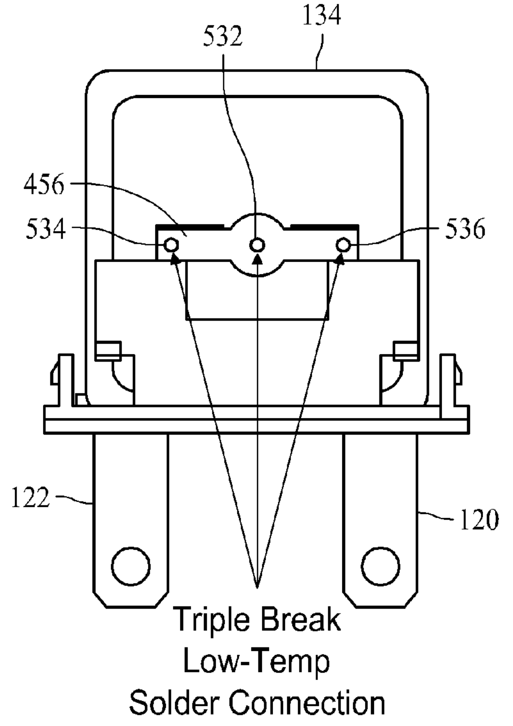
FIG. 37 is a view similar to FIG. 33 without the thermal disconnect element.
Figure 38:
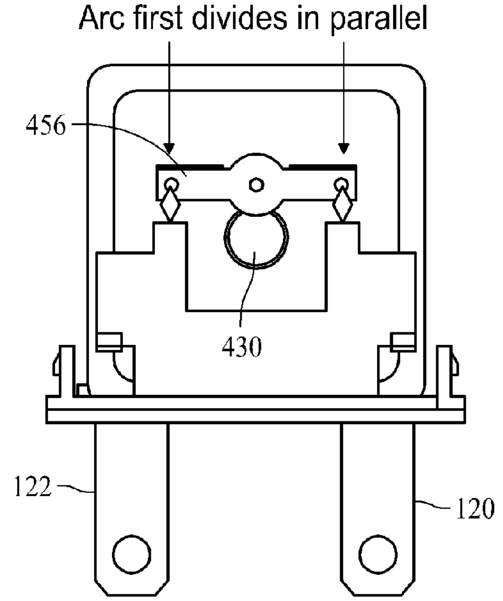
FIG. 38 is a view similar to FIG. 37 and showing the device at a first stage of operation.
Figure 39:
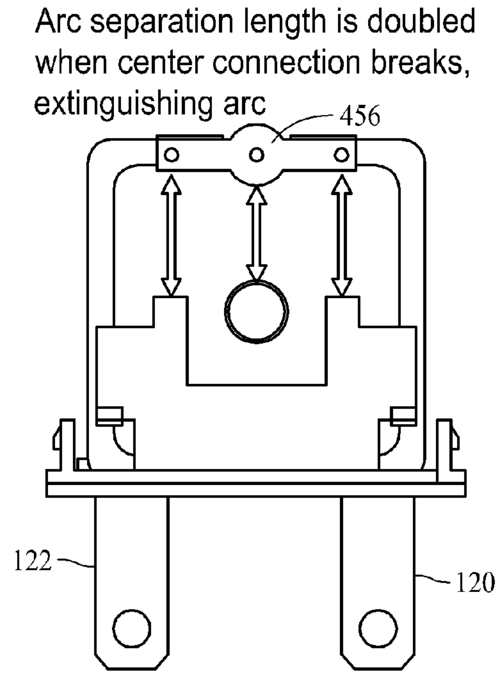
FIG. 39 is a view similar to FIG. 38 and showing the device at a second stage of operation.

FIGS. 37-39 illustrate another embodiment of a thermal disconnect device illustrating the triple-break operation of the device as it operates. The contact bridge 456 is soldered to the slug 430 at a first location 532, and soldered to the terminal 120 at second and third locations 534 and 536. As the soldered connections 532, 534 and 536 are heated via current flow through the varistor element 134, the bridge contact 456 begins to move and break the electrical connections at the locations 534, 536 while the electrical connection 532 remains. As this occurs, electrical arcing is first divided in parallel via the locations 534 and 536 as shown in FIG. 38. When the electrical contact with the slug 430 is broken shortly thereafter as shown in FIG. 39, electrical arcing occurs at a third location between the locations of the divided arcs shown in FIG. 38. The arc length separation is increased as the contact bridge 456 is moved fully to the final disconnect position, and arcing ceases completely as the contact bridge 456 assumes its final position.

As noted, the contact bridge 456 in this example is soldered directly to the terminal 120 and no short circuit disconnect element 140 is provided as in other embodiments disclosed above. For high voltage DC applications, the arrangement shown in FIGS. 37-39 may capably perform without the short circuit disconnect element 140, a fuse, or other alternative elements to interrupt the electrical connection through the device independently from the varistor element 134. Further, to the extent that a short circuit disconnect element may be desirable in such an embodiment, it may be considerably simplified from the short circuit disconnect element 140 shown and described in relation to the embodiments above.

Moreover, the arrangement shown in FIGS. 37-39 may involve an epoxy encapsulated MOV that does not require the base plate 132 described in relation to other of the embodiments discussed above. In other embodiments, the base plate 132 may be included as desired.

Figure 40:
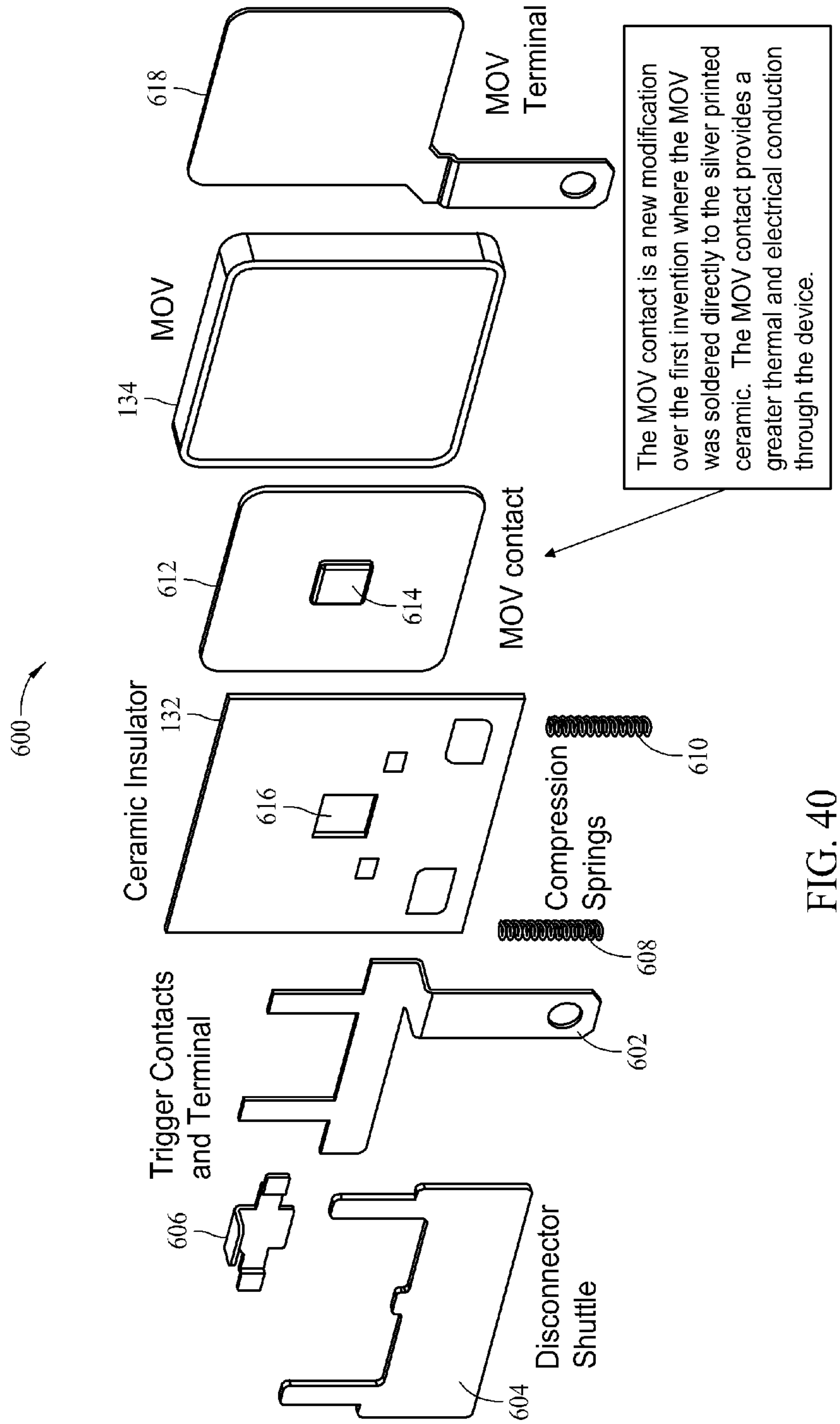
FIG. 40 illustrates a partial exploded assembly view of another embodiment of a surge suppression device.

FIG. 40 illustrates a partial exploded assembly view of another embodiment of a surge suppression device 600.

The assembly includes a first terminal 602, a thermal disconnect element 604, a contact bridge 606 and bias elements 608, 610 providing a triple break feature as discussed above. The terminal 602 is soldered to one surface of the base plate 132 and the thermal disconnect element 604 operates similarly to those described above.

On the side of the base plate 132 opposite the terminal 602 a plate contact 612 is provided and soldered thereto. The plate contact 612 has a surface area that is substantially coextensive with the facing surfaces of the base plate 312 and the varistor element 134 that attaches to the side of the plate contact 612 opposite the base plate 132. The plate contact 612 includes a raised contact section 614 that is inserted through an opening 616 in the base plate 132. The contact section 614 is therefore exposed on the opposite side of the base plate 132 and the contact bridge 606 can be soldered thereto. The plate contact 612 may be fabricated from a conductive material known in the art such as silver, and because of its comparatively larger surface area it provides improved thermal and electrical conduction through the device 600 relative to the embodiments described above.

A second terminal 618 is soldered to the side of the varistor element 134 opposing the plate contact 612 to complete the assembly. A rather compact, yet effective, device construction is provided.

The benefits and advantages of the invention are now believed to be evident from the exemplary embodiments described.

An embodiment of a transient voltage surge suppression device has been disclosed, including: a varistor assembly including: a varistor element having opposed first and second sides, the varistor element operable in a high impedance mode and a low impedance mode in response to an applied voltage; a first conductive terminal provided on a first side of the varistor; a second conductive terminal provided on the second side of the varistor element; a separable contact bridge interconnecting one of the first and second terminals and varistor; and a thermal disconnect element, the separable contact bridge carried on and movable with the thermal disconnect element along a linear axis relative to the varistor element.

Optionally, the device may further include a contact provided on the first side of the varistor element, the separable contact bridge connected to the contact. The contact may include one of a contact slug and a contact plate.

The thermal disconnect element may be slidably moveable along a rail, and may be biased toward a disconnected position. The first conductive terminal may include a terminal blade having a longitudinal axis, and the thermal disconnect element may be movable along an axis parallel to the longitudinal axis, or may be movable along an axis perpendicular to the longitudinal axis.

The device may also include a local status indicator. The local status indicator may display at least a first color when the device in a first operating state, and at least a second color when the device is in a second operating state. The local status indicator may be slidably movable between a first position and a second position. The local status indicator may be coupled to and movable with the thermal disconnect element. The device may includes a housing, with the varistor assembly situated in the housing, and wherein the local status indicator includes first and second tabs, the first and second tabs projecting from the housing to indicate a disconnected operating state of the device.

The device may also include a remote status indicator. The remote status indicator may include a switch. The switch may be actuated by the thermal disconnect element when the device is in a disconnected state.

The varistor element may be an epoxy coated metal oxide varistor. Each of the first conductive terminal and the second conductive terminal may include terminal blades. At least one of the first and second conductive terminals may include a surface having elevated mounting surfaces separated by depressions.

An insulating base plate may be mounted stationary relative to the varistor element, the insulating plate having opposed first and second sides, and one of the opposing first and second sides of the varistor being surface mounted to one of the opposing sides of the plate. The insulative base plate may include a ceramic plate, and the ceramic plate may include alumina ceramic. The insulative base plate may include a contact element extending through and between the opposing sides of the insulating base plate. The insulative base plate may include a central opening, with the contact element filling the opening. The contact element may be substantially circular. The contact element may be a solder slug. The contact element may also be a plate contact, the plate contact having a projecting section that extends through and between the opposing sides of the insulating base plate.

The device may also include comprising a short circuit disconnect element, thereby providing at least first and second modes of operation for the device.

Another embodiment of a transient voltage surge suppression device has been disclosed including: a varistor assembly comprising: a varistor element having opposed first and second sides, the varistor element operable in a high impedance mode and a low impedance mode in response to an applied voltage; a first conductive terminal provided on a first side of the varistor; and a second conductive terminal provided on the second side of the varistor element; and a separable contact bridge interconnecting one of the first and second terminals and varistor, the separable contact bridge configured to provide a triple break disconnection to the varistor element.

Optionally, the separable contact bridge is connected directly to one of the first and second conductive terminals. The varistor element may be an epoxy encapsulated metal oxide varistor.

An insulating base plate may also be in surface contact with the varistor element. The base plate may include at least one opening therein, with the device further including a contact element extending through the opening. The contact element may be one of a contact via, a conductive slug, and a plate projection.

The device may further include a thermal disconnect element, the separable contact bridge carried on and movable with the thermal disconnect element along a linear axis relative to the varistor element. At least one of the first and second conductive terminals may include a contact blade having a longitudinal axis, and the linear axis may extend parallel to the longitudinal axis.

The device may also include a local status indicator, the local status indicator carried by and movable with the thermal disconnect element. The local status indicator may be color coded. A remote status element may also be provided, with the remote status element actuated by movement of the thermal disconnect element.

The device may further include a short circuit disconnect element, and wherein the separable contact bridge is connected directly to the short circuit disconnect element at a first location and at a second location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A transient voltage surge suppression device comprising:
  a varistor assembly comprising:
    a varistor element having opposed first and second major side surfaces, the varistor element configured to operate in a high impedance mode and a low impedance mode in response to an applied voltage;
    a first conductive terminal provided on the first major side surface of the varistor element;
    a second conductive terminal provided on the second major side surface of the varistor element;
    a separable contact bridge interconnecting one of the first and second terminals and the varistor element; and
    a thermal disconnect element, the separable contact bridge carried on and movable with the thermal disconnect element along a linear axis relative to the varistor element.

2. The device of claim 1, further comprising a contact provided on the first major side surface of the varistor element, the separable contact bridge connected to the contact.

3. The device of claim 2, wherein the contact comprises one of a contact slug and a contact plate.

4. The device of claim 1, wherein the thermal disconnect element is slidably moveable along a rail.

5. The device of claim 1, wherein the thermal disconnect element is biased toward a disconnected position.

6. The device of claim 1, wherein the first conductive terminal comprises a terminal blade having a longitudinal axis, and the thermal disconnect element is movable along an axis parallel to the longitudinal axis.

7. The device of claim 1, wherein the first conductive terminal comprises a terminal blade having a longitudinal axis, and the thermal disconnect element is movable along an axis perpendicular to the longitudinal axis.

8. The device of claim 1, further comprising a local status indicator.

9. The device of claim 8, wherein the local status indicator displays at least a first color when the device in a first operating state, and at least a second color when the device is in a second operating state.

10. The device of claim 8, wherein the local status indicator is slidably movable between a first position and a second position.

11. The device of claim 8, the local status indicator being coupled to and movable with the thermal disconnect element.

12. The device of claim 8, further comprising a housing, the varistor assembly situated in the housing, and wherein the local status indicator comprises first and second tabs, the first and second tabs projecting from the housing to indicate a disconnected operating state of the device.

13. The device of claim 1, further comprising a remote status indicator for the device.

14. The device of claim 13, wherein the remote status indicator comprises a switch.

15. The device of claim 14, the switch being actuated by the thermal disconnect element when the device is in a disconnected state.

16. The device of claim 1, wherein the varistor element comprises an epoxy coated metal oxide varistor.

17. The device of claim 1, each of the first conductive terminal and the second conductive terminal comprising terminal blades.

18. The device of claim 1, further comprising an insulating base plate mounted stationary relative to the varistor element, the insulating base plate having opposed first and second sides, and one of the opposing first and second sides of the varistor being surface mounted to one of the opposing sides of the insulating base plate.

19. The device of claim 18, wherein the insulating base plate is a ceramic plate.

20. The device of claim 19, wherein the ceramic plate comprises alumina ceramic.

21. The device of claim 18, wherein the insulating base plate further comprises a contact element extending through and between the opposing sides of the insulating base plate.

22. The device of claim 21, wherein the insulating base plate comprises a central opening, and the contact element filling the opening.

23. The device of claim 22, wherein the contact element is substantially circular.

24. The device of claim 22, wherein the contact element comprises a solder slug.

25. The device of claim 21, wherein the contact element comprises a plate contact, the plate contact having a projecting section that extends through and between the opposing sides of the insulating base plate.

26. The device of claim 1, further comprising a short circuit disconnect element, thereby providing at least first and second modes of operation for the device.

27. The device of claim 1, wherein at least one of the first and second conductive terminals comprises a surface having elevated mounting surfaces separated by depressions.

28. A transient voltage surge suppression device comprising:

a varistor assembly comprising:

a varistor element having opposed first and second major side surfaces, the varistor element configured to operate in a high impedance mode and a low impedance mode in response to an applied voltage;

a first conductive terminal provided on the first major side surface of the varistor element; and a second conductive terminal provided on the second major side surface of the varistor element; and a separable contact bridge interconnecting one of the first and second conductive terminals and the varistor element, the separable contact bridge configured to establish electrical connection in the varistor assembly at a first location, a second location spaced from the first location, and a third location spaced from the second location.

29. The device of claim 28, wherein the separable contact bridge is connected directly to one of the first and second conductive terminals.

30. The device of claim 28, wherein the varistor element comprises an epoxy encapsulated metal oxide varistor.

31. The device of claim 28, further comprising an insulating base plate in surface contact with one of the opposed first and second sides of the varistor element.

32. The device of claim 31, wherein the insulating base plate includes at least one opening therein, the device further comprising a contact element extending through the opening.

33. The device of claim 32, wherein the contact element comprises one of a conductive slug and a plate projection.

34. The device of claim 28, further comprising a thermal disconnect element, the separable contact bridge carried on and movable with the thermal disconnect element along a linear axis relative to the varistor element.

35. The device of claim 34, wherein at least one of the first and second conductive terminals comprises a contact blade having a longitudinal axis, and the linear axis extends in at least one of a parallel orientation and a perpendicular orientation to the longitudinal axis.

36. The device of claim 34, further comprising a local status indicator, the local status indicator carried by and movable with the thermal disconnect element.

37. The device of claim 36, wherein the local status indicator is color coded.

38. The device of claim 36, further comprising a remote status element, the remote status element actuated by movement of the thermal disconnect element.

39. The device of claim 28, further comprising a short circuit disconnect element, and wherein the separable contact bridge is connected directly to the short circuit disconnect element.

* * * * *